US012217343B2

(12) United States Patent
Kimura et al.

(10) Patent No.: US 12,217,343 B2
(45) Date of Patent: Feb. 4, 2025

(54) INFORMATION PROCESSING DEVICE, INFORMATION PROCESSING METHOD, AND PROGRAM FOR CAUSING A VIRTUAL OBJECT TO PERFORM MOVEMENT ACCORDING TO A SOUND REPRODUCED FROM A REAL SOUND SOURCE

(71) Applicant: SONY GROUP CORPORATION, Tokyo (JP)

(72) Inventors: Takaomi Kimura, Tokyo (JP); Yasuko Ishihara, Tokyo (JP); Hajime Wakabayashi, Tokyo (JP); Atsushi Ishihara, Kanagawa (JP); Masayuki Inoue, Chiba (JP); Hirotake Ichikawa, Kanagawa (JP); Hidenori Aoki, Chiba (JP); Ryo Fukazawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 93 days.

(21) Appl. No.: 17/774,681

(22) PCT Filed: Sep. 4, 2020

(86) PCT No.: PCT/JP2020/033540
§ 371 (c)(1),
(2) Date: May 5, 2022

(87) PCT Pub. No.: WO2021/095330
PCT Pub. Date: May 20, 2021

(65) Prior Publication Data
US 2022/0414960 A1    Dec. 29, 2022

(30) Foreign Application Priority Data

Nov. 12, 2019    (JP) .................................. 2019-204438

(51) Int. Cl.
*G06T 13/20*    (2011.01)
*G06T 19/00*    (2011.01)
*G09G 5/00*    (2006.01)

(52) U.S. Cl.
CPC ............ *G06T 13/205* (2013.01); *G06T 19/00* (2013.01); *G06T 19/003* (2013.01); *G06T 19/006* (2013.01)

(58) Field of Classification Search
None
See application file for complete search history.

(56) References Cited

U.S. PATENT DOCUMENTS 5,754,660 A    5/1998    Shimizu
2007/0265072 A1*    11/2007    Matsuda ................. A63F 13/10
                                                                                                   463/35

(Continued)

FOREIGN PATENT DOCUMENTS

CN    105379311 A    3/2016
CN    109597481 A    4/2019

(Continued)

OTHER PUBLICATIONS

Liu Jin'guang et al., "Analysis and Implementation of 3D Audio in Virtual Scenes", Compotech 01, Jan. 15, 2010.

*Primary Examiner* — Michael J Cobb
(74) *Attorney, Agent, or Firm* — Paratus Law Group, PLLC

(57) ABSTRACT

An information processing device including a control unit that displays a virtual object on a three-dimensional coordinate space associated with a real space and causes the virtual object to perform a predetermined movement according to a predetermined sound reproduced from a real sound source disposed in the real space, in which the control unit performs delay amount setting processing of increasing a delay amount of movement start timing at which the virtual (Continued)

object is caused to perform the predetermined movement with respect to reproduction timing at which the real sound source reproduces the predetermined sound, as a position of the real sound source in the real space and a position of the virtual object on the three-dimensional coordinate space are separated from each other.

18 Claims, 20 Drawing Sheets

(56) References Cited

U.S. PATENT DOCUMENTS

| | | | |
|---|---|---|---|
| 2013/0182858 A1 | 7/2013 | You | |
| 2016/0212538 A1 | 7/2016 | Fullam et al. | |
| 2022/0137701 A1* | 5/2022 | Bowman | G06F 3/012 |
| | | | 345/156 |
| 2022/0291744 A1* | 9/2022 | Sugihara | G06F 3/013 |
| 2022/0412741 A1* | 12/2022 | Wakabayashi | G01C 21/206 |
| 2023/0186542 A1* | 6/2023 | Gotoh | G06F 3/165 |
| | | | 345/419 |

FOREIGN PATENT DOCUMENTS

| | | |
|---|---|---|
| JP | 2004193877 A | 7/2004 |
| JP | 2011199707 A | 10/2011 |
| JP | 2015-073182 A | 4/2015 |
| JP | 2015-510629 A | 4/2015 |
| JP | 2018-183483 A | 11/2018 |

* cited by examiner

FIG. 2

|  | POSITION OF USER IS CLOSE TO STAGE | POSITION OF USER IS FAR FROM STAGE |  |
|---|---|---|---|
| POSITION OF VIRTUAL OBJECT IS ON STAGE | (PATTERN P1) TIMING OF VIDEO COINCIDES WITH TIMING OF SOUNDS | (PATTERN P3) SOUNDS REACH USER LATER THAN VIDEO | REALITY CAN BE FELT WHEN DISPLAY TIMING COINCIDES REGARDLESS OF DISTANCE BETWEEN USER AND STAGE |
| POSITION OF VIRTUAL OBJECT IS RIGHT IN FRONT OF USER | (PATTERN P2) TIMING OF VIDEO COINCIDES WITH TIMING OF SOUNDS | (PATTERN P4) TIMING OF VIDEO COINCIDES WITH TIMING OF SOUNDS | REALITY CAN BE FELT WHEN DISPLAY TIMING VARIES DEPENDING ON DISTANCE BETWEEN USER AND STAGE |
|  | REALITY CAN BE FELT WHEN TIMING OF VIDEO ALWAYS COINCIDES WITH TIMING OF SOUNDS | REALITY CAN BE FELT WHEN DISPLAY TIMING VARIES DEPENDING ON POSITION OF VIRTUAL OBJECT |  |

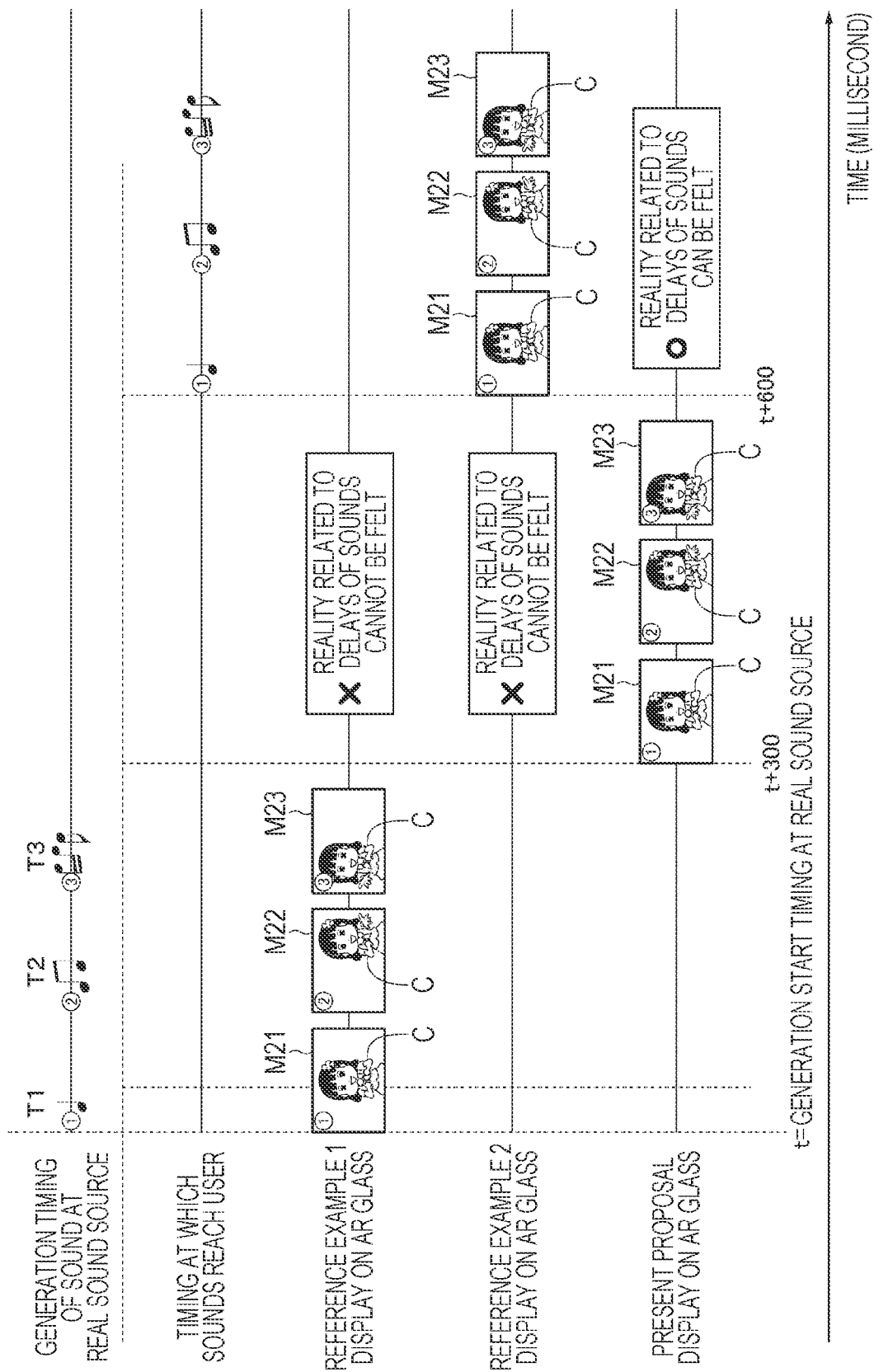

FIG. 12

|  | REFERENCE EXAMPLE 1 SYNCHRONIZE DISPLAY ON AR GLASS WITH GENERATION TIMING OF SOUNDS | | REFERENCE EXAMPLE 2 SYNCHRONIZE DISPLAY ON AR GLASS WITH TIMING AT WHICH SOUNDS REACH USER | | PRESENT PROPOSAL CONTROL MOVEMENT START TIMING OF VIRTUAL OBJECT ACCORDING TO DISTANCE BETWEEN REAL SOUND SOURCE AND VIRTUAL OBJECT | |
| --- | --- | --- | --- | --- | --- | --- |
|  | POSITION OF USER IS 10m AWAY FROM STAGE | POSITION OF USER IS 200m AWAY FROM STAGE | POSITION OF USER IS 10m AWAY FROM STAGE | POSITION OF USER IS 200m AWAY FROM STAGE | POSITION OF USER IS 10m AWAY FROM STAGE | POSITION OF USER IS 200m AWAY FROM STAGE |
| POSITION OF VIRTUAL OBJECT IS ON STAGE | ○ | ○ | ○ | × | ○ | ○ |
| POSITION OF VIRTUAL OBJECT IS RIGHT IN FRONT OF USER | ○ | × | ○ | ○ | ○ | ○ |
| POSITION OF VIRTUAL OBJECT IS IN MIDDLE BETWEEN USER AND STAGE | ○ | × | ○ | × | ○ | ○ | ant
INFORMATION PROCESSING DEVICE, INFORMATION PROCESSING METHOD, AND PROGRAM FOR CAUSING A VIRTUAL OBJECT TO PERFORM MOVEMENT ACCORDING TO A SOUND REPRODUCED FROM A REAL SOUND SOURCE

CROSS REFERENCE TO PRIOR APPLICATION

This application is a National Stage Patent Application of PCT International Patent Application No. PCT/JP2020/033540 (filed on Sep. 4, 2020) under 35 U.S.C. § 371, which claims priority to Japanese Patent Application No. 2019-204438 (filed on Nov. 12, 2019), which are all hereby incorporated by reference in their entirety.

TECHNICAL FIELD

The present invention relates to an information processing device, an information processing method, and a program.

BACKGROUND ART

Conventionally, proposals for controlling reproduction timing of content have been made (see, for example, Patent Documents 1 and 2 below).

CITATION LIST

Patent Document

Patent Document 1: Japanese Patent Application Laid-Open No. 2018-183483
Patent Document 2: Japanese Patent Application Laid-Open No. 2015-073182

SUMMARY OF THE INVENTION

Problems to be Solved by the Invention

Incidentally, in a live venue, normally, the longer the distance to a stage is, the later sounds emitted from the stage reach users. In recent years, a live form in which a video of a virtual singes rather than an actual singer singing or dancing on a stage is reproduced while sounds are reproduced from a speaker on the stage has been proposed. Even in such a live form, reality related to delays of sounds reproduced from a speaker is required, but it is difficult to recreate the reality related to delays of sounds as appropriate using the technology described in the above-described Patent Documents.

An object of the present disclosure is to provide an information processing device, an information processing method, and a program capable of recreating the reality related to delays of sounds reproduced from a real sound source as appropriate.

Solutions to Problems

The present disclosure is, for example,
an information processing device including
a control unit that displays a virtual object on a three-dimensional coordinate space associated with a real space and causes the virtual object to perform a predetermined movement according to a predetermined sound reproduced from a real sound source disposed in the real space,
in which the control unit performs delay amount setting processing of increasing a delay amount of movement start timing at which the virtual object is caused to perform the predetermined movement with respect to reproduction timing at which the real sound source reproduces the predetermined sound, as a position of the real sound source in the real space and a position of the virtual object on the three-dimensional coordinate space are separated from each other.

The present disclosure is, for example,
an information processing method performed by a control unit, including
displaying a virtual object on three-dimensional coordinate space associated with a real space and causing the virtual object to perform a predetermined movement according to a predetermined sound reproduced from a real sound source disposed in the real space,
in which the control unit performs delay amount setting processing of increasing a delay amount of movement start timing at which the virtual object is caused to perform the predetermined movement with respect to reproduction timing at which the real sound source reproduces the predetermined sound, as a position of the real sound source in the real space and a position of the virtual object on the three-dimensional coordinate space are separated from each other.

The present disclosure is, for example,
a program that causes a computer to execute an information processing method performed by a control unit, in which the method includes
displaying a virtual object on a three-dimensional coordinate space associated with a real space, and causing the virtual object to perform a predetermined movement according to a predetermined sound reproduced from a real sound source disposed in the real space,
in which the control unit performs delay amount setting processing of increasing a delay amount of movement start timing at which the virtual object is caused to perform the predetermined movement with respect to reproduction timing at which the real sound source reproduces the predetermined sound, as a position of the real sound source in the real space and a position of the virtual object on the three-dimensional coordinate space are separated from each other.

BRIEF DESCRIPTION OF DRAWINGS

FIG. 2 is a diagram to be referred to when an issue to be considered in the one embodiment is described.

FIG. 11 is a diagram for describing a specific example of processing performed by the reproduction system according to the one embodiment.

FIG. 12 is a table indicating that reality related to delays of sounds can be achieved by processing performed by the reproduction system according to the one embodiment.

MODE FOR CARRYING OUT THE INVENTION

Hereinafter, an embodiment and the like of the present disclosure are described with reference to the drawings. Note that the description is given in the following order.

One Embodiment

Modifications

An embodiment and the like described below are preferred specific examples of the present disclosure, and content of the present disclosure is not limited to the embodiment and the like.

One Embodiment

Processing Performed in Embodiment

First, processing performed in the present embodiment is described. In the present embodiment, a relatively large-scale reproduction system such as a live venue is assumed.

Outline of Reproduction System

Figure 1:
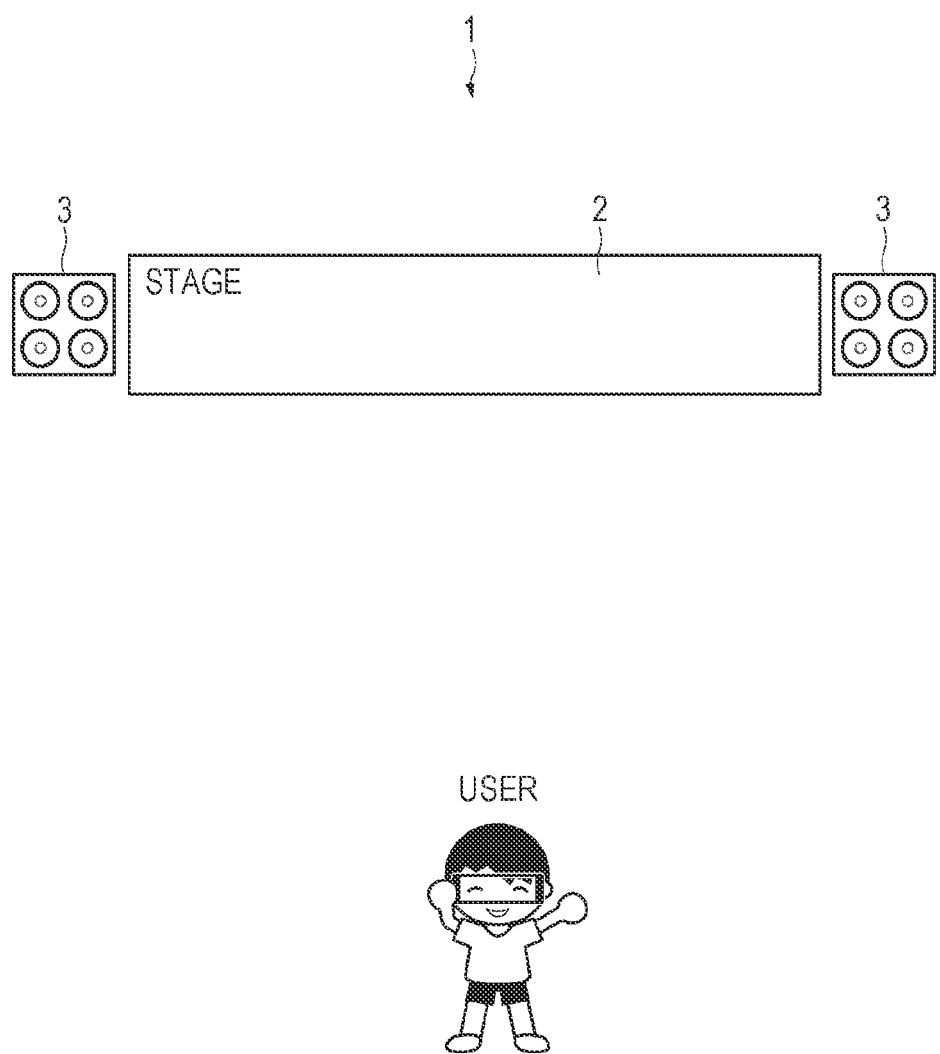
FIG. 1 is a diagram for describing a reproduction system according to one embodiment.

FIG. 1 is a diagram schematically illustrating a reproduction system (reproduction system 1) according to the present embodiment. The reproduction system 1 includes, for example, a stage 2, and speakers 3 that are an example of real sound sources are disposed on the stage 2 or around the stage 2. Actual sounds (music, sound effects, announcement sounds, and the like) are reproduced from the speakers 3. Although FIG. 1 illustrates an example in which speakers 3 are disposed at both of the left and right sides of the stage 2, the number and the arrangement mode of the speakers 3 can be varied as appropriate.

Facing the stage 2, there is a user who is a spectator. The user watches a video in which a virtual object imitating a singer or a dancer is displayed while listening to sounds reproduced from the speakers 3. The virtual object may be a real person such as a singer rather than a virtual object such as a virtual singer or the like artificially created, and the video may be a video in which such a real person is displayed. The video is displayed on a smart display carried or worn by a user. The smart display is a display capable of rendering virtual information in a reality space, and specifically, a display of a smartphone owned by a user, a glass-type display (also referred to as an augmented reality (AR) glass or the like), a head up display (HUD), or the like can be exemplified. Each user can view the same video content by, for example, installing the same application in a device including a smart display and reproducing the video content. As described above, the reproduction system 1 according to the present embodiment is a system that performs live reproduction in which a real stage and a virtual object are integrated.

Issue to be Considered

Next, an issue to be considered in the above-described reproduction system 1 is described. In a case where an attempt to recreate reality related to a delay of music reproduced from a real sound source to reach a user is made while a video is displayed on a smart display, appropriate timing at which a virtual object performs a predetermined movement (motion) varies depending on the distance between a user and the stage 2 and the position of the virtual object.

FIG. 2 is a diagram for describing an example of reality corresponding to user positions and positions of a virtual object. In the table indicated in FIG. 2, the positions of a virtual object as virtual objects are defined in the vertical direction. Specifically, a pattern in which the position of a virtual object is on a stage and a pattern in which the position of a virtual object is right in front of a user are defined. Furthermore, in the table indicated in FIG. 2, relations between the positions of a user and the positions of a stage are defined in the lateral direction. Specifically, a pattern in which the position of a user is close to a stage and a pattern in which the position of a user is far from the stage are defined.

In a case of a pattern in which the position of a virtual object is on the stage and the position of a user is close to the stage (hereinafter referred to as a pattern P1 as appropriate), reality can be felt when timing of a video coincides with timing of sounds. In a case of a pattern in which the position of a virtual object is right in front of a user and the position of the user is close to the stage (hereinafter referred to as a pattern P2 as appropriate), reality can be felt when timing of a video coincides with timing of sounds. In light of the patterns P1 and P2, reality can be felt when timing of a video always coincides with timing of sounds.

In a case of a pattern in which the position of a virtual object is on the stage and the position of a user is far from the stage (hereinafter referred to as a pattern P3 as appropriate), reality can be felt when sounds reach a user later than a video. In a case of a pattern in which the position of a virtual object is right in front of a user and the position of the user is far from the stage (hereinafter referred to as a pattern P4 as appropriate), reality can be felt when timing of a video coincides with timing of sounds. In light of the patterns P3 and P4, reality can be felt when display timing varies depending on the position of a virtual object.

Furthermore, in light of the patterns P1 and P3, reality can be felt when display timing of a virtual object coincides regardless of the distance between a user and the stage. Furthermore, in light of the patterns P2 and P4, reality can be felt when display timing of a virtual object varies depending on the distance between a user and the stage. The technique described in the above-described patent documents has an issue that the reality cannot be recreated.

Outline of One Embodiment

Figure 3:
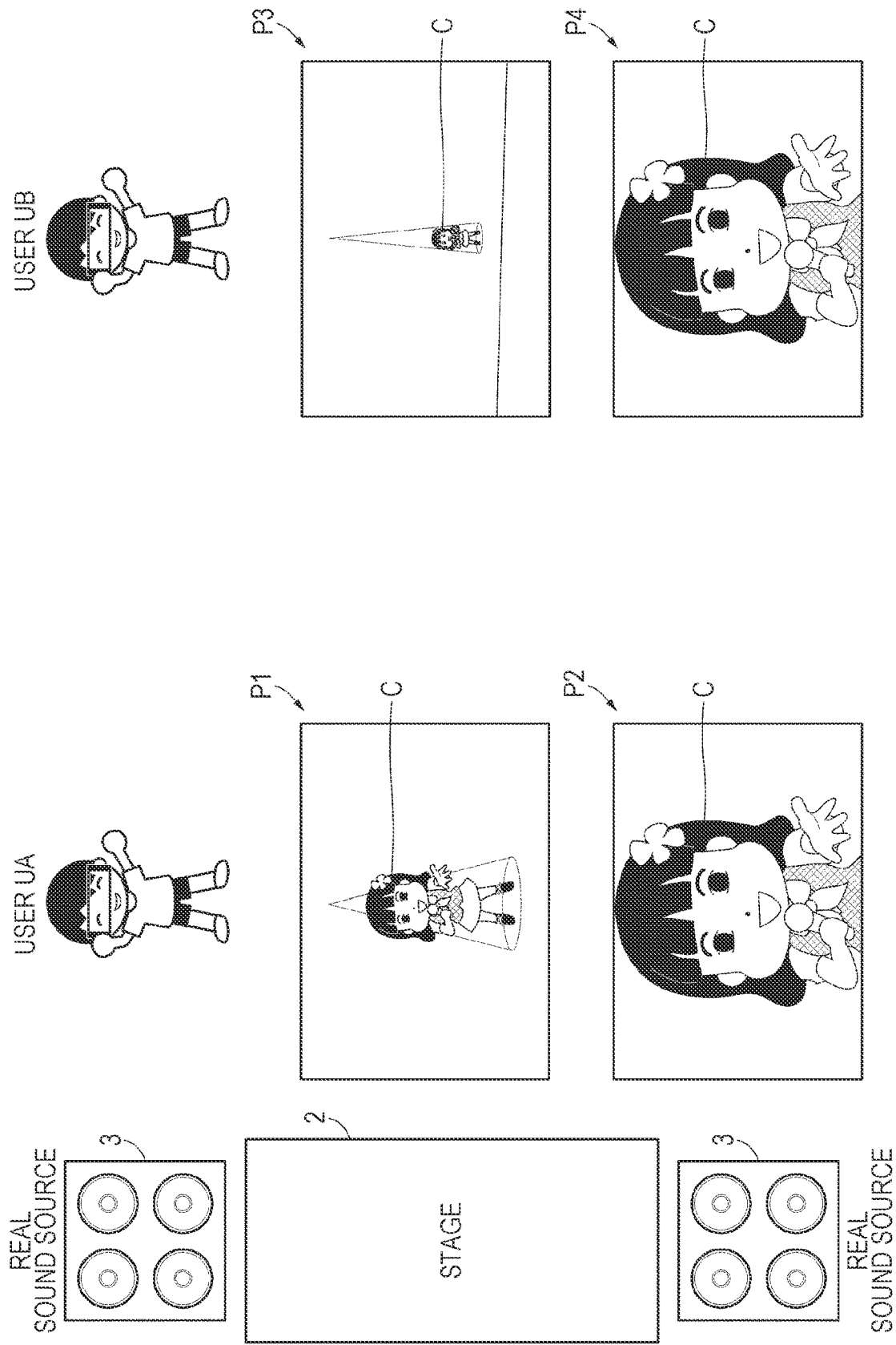
FIG. 3 is a diagram for describing an outline of the one embodiment.
Figure 4:
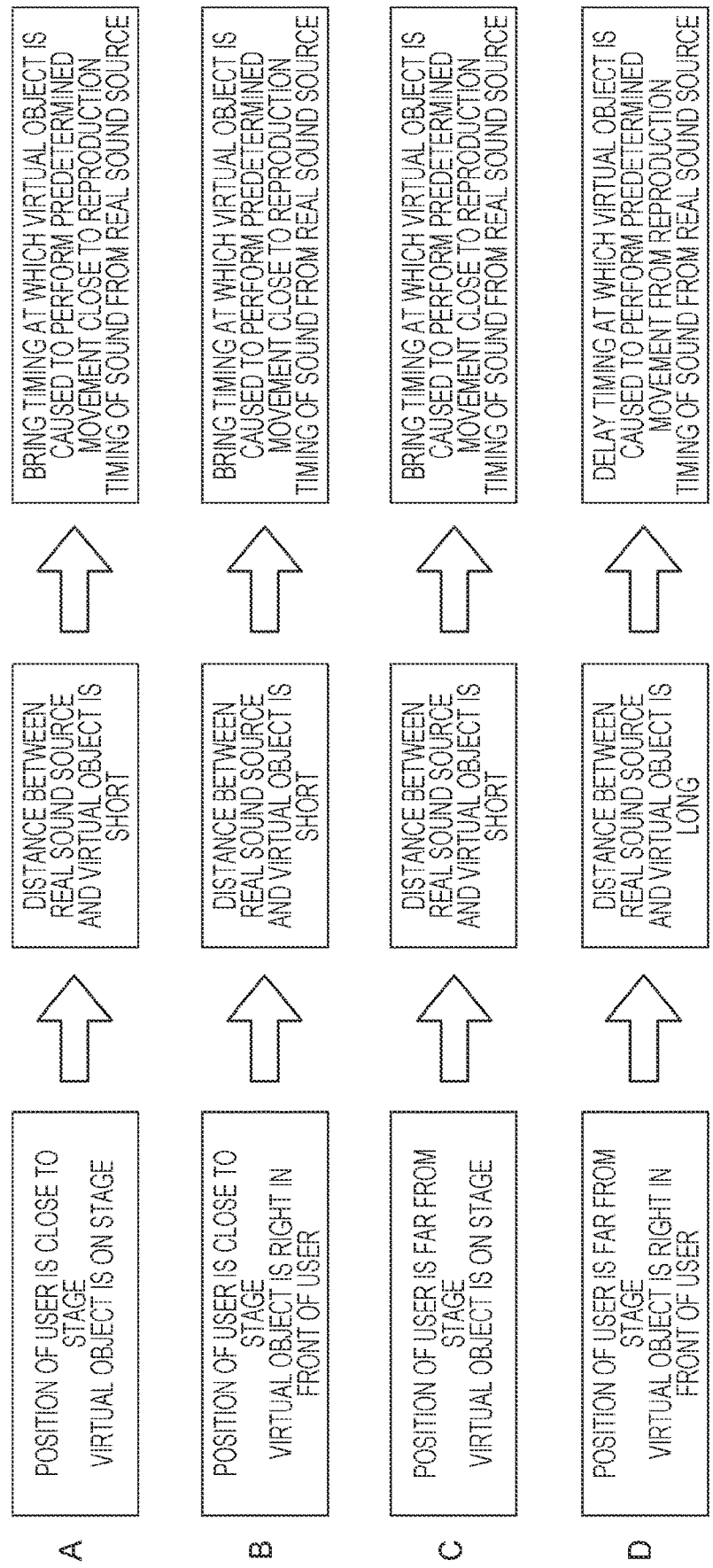
FIGS. 4A to 4D are diagrams for describing the outline of the one embodiment.

Next, an outline of the present embodiment is described with reference to FIGS. 3 and 4. FIG. 3 is a diagram schematically illustrating the above-described four patterns (patterns P1, P2, P3, and P4), and in FIG. 3, a user close to the stage 2 is a user UA, and a user far from the stage 2 is a user UB. Furthermore, FIG. 3 illustrates a virtual object C displayed on a smart display according to each pattern.

FIGS. 4A to 4D are diagrams for describing an outline of processing performed according to each pattern. FIG. 4A illustrates processing performed in a case of the pattern P1. In a case of the pattern P1, processing of bringing timing at which the virtual object is caused to perform a predetermined movement (hereinafter referred to as movement start timing as appropriate) close to reproduction timing of a sound reproduced from a real sound source is performed.

FIG. 4B illustrates processing performed in a case of the pattern P2. In a case of the pattern P2, the processing of bringing the movement start timing at which the virtual object is caused to perform the predetermined movement close to the reproduction timing of the sound reproduced from the real sound source is performed.

FIG. 4C illustrates processing performed in a case of the pattern P3. In a case of the pattern P2, the processing of bringing the movement start timing at which the virtual object is caused to perform the predetermined movement close to the reproduction timing of the sound reproduced from the real sound source is performed.

FIG. 4D illustrates processing performed in a case of the pattern P4. In a case of the pattern P4, processing of delaying the movement start timing at which the virtual object is caused to perform the predetermined movement from the reproduction timing of the sound reproduced from the real sound source is performed.

Specific Examples of Processing

Figure 5:
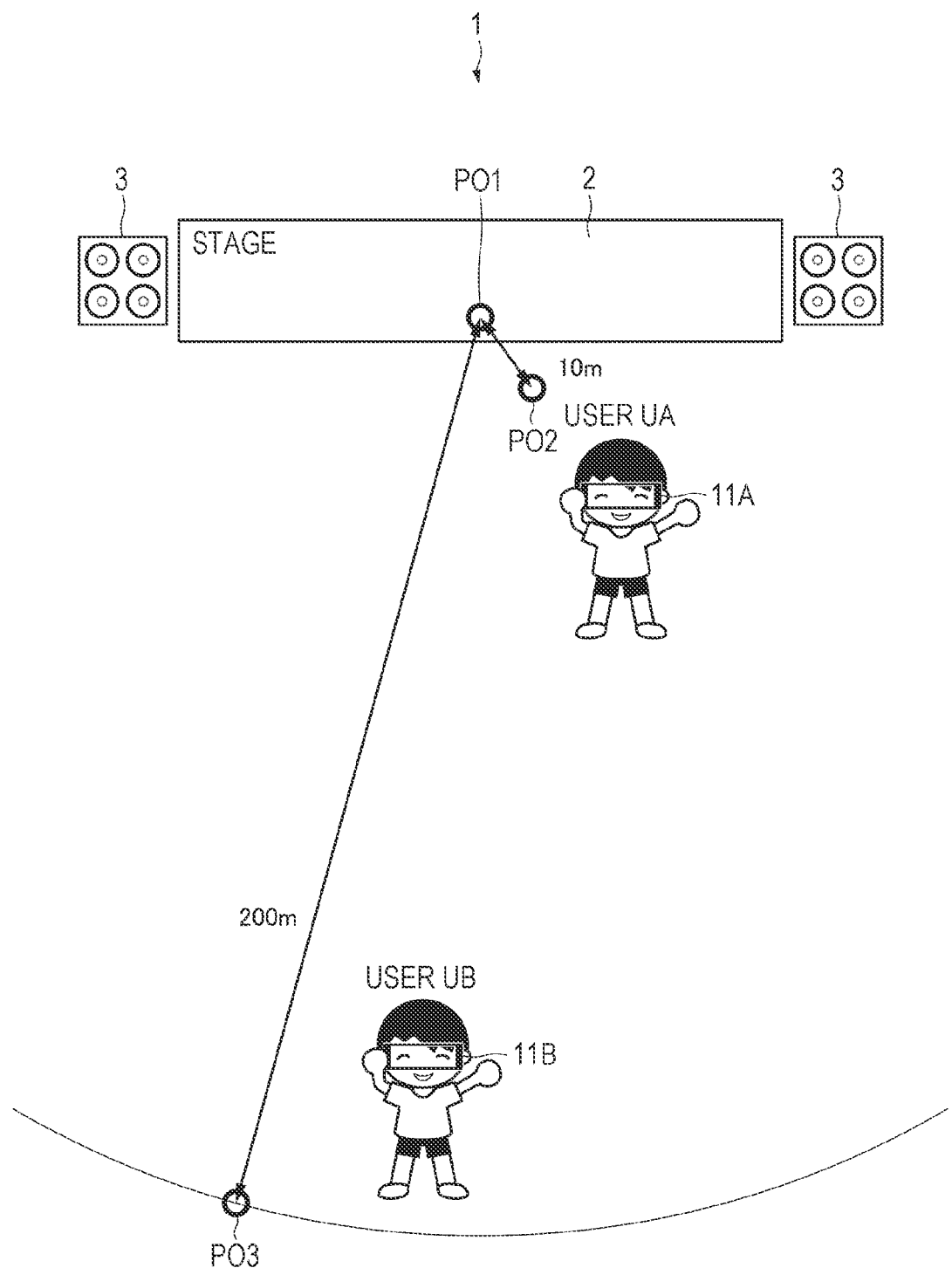
FIG. 5 is a diagram for describing a specific example of the reproduction system.

The outline of the processing described above is described with specific examples. FIG. 5 illustrates a specific example of the reproduction system 1. As described above, the reproduction system 1 includes the stage 2 and the speakers 3. A position PO1 on the stage 2 indicates a position of a virtual object in a case where the position is on the stage 2. Here, the position of a virtual object is a position of the virtual object on a three-dimensional coordinate space associated with a real space, and is a position obtained by calculation to be described below. Note that in the example, it is assumed that the stage 2 and the speakers 3 are located at the same position. Therefore, in a case where a virtual object is at the position PO1 on the stage 2, the distance between the virtual object and the speakers 3 is set to 0.

A position PO2 in the reproduction system 1 indicates the position of the user UA who is close to the stage 2. The position of the user UA, for example, corresponds to the position of a smart display held or worn by the user UA. The distance between the user UA and the stage 2 is, for example, 10 m. Regarding the sounds, the user UA listens to sounds of music reproduced from the speakers 3, and visually recognizes a virtual object through a glass-type AR glass 11A that is an example of the smart display. Note that in a case where a virtual object comes right in front of the user UA, that is, the virtual object is displayed on the AR glass 11A in such a manner as to be right in front of the user UA, the position of the virtual object substantially coincides with the position PO2.

Furthermore, a position PO3 in the reproduction system 1 indicates the position of the user UB who is far from the stage 2. The position of the user UB, for example, corresponds to the position of a smart display held or worn by the user UB. The distance between the user UB and the stage 2 is, for example, 200 m. Regarding the sounds, the user UB listens to sounds of music reproduced from the speakers 3, and visually recognizes a virtual object through a glass-type AR glass 11B that is an example of the smart display. Note that in a case where a virtual object comes right in front of the user UB, that is, the virtual object is displayed on the AR glass 11B in such a manner as to be right in front of the user UB, the position of the virtual object substantially coincides with the position PO3.

In the reproduction system 1 in the real space described above, the distance between the speakers 3 and the position of a virtual object is defined as D (m). In this case, movement start timing at which a virtual object performs a predetermined movement after a sound corresponding to the predetermined movement is reproduced from the speakers 3 is set to timing delayed from predetermined timing by $$D*1000/340 \text{ (msec)} \quad \text{(Mathematical Expression 1)}$$

(here, the sound velocity is assumed to be 340 m/sec).

Therefore, a delay amount of the movement start timing at which a virtual object is caused to perform a predetermined movement with respect to the reproduction timing at which the speakers 3 reproduce a predetermined sound is set to be larger as the position of the speakers 3 in the real space and the position of a virtual object on the three-dimensional coordinate space are separated from each other. From the set movement start timing, a video in which a virtual object performs a predetermined movement is rendered on an AR glass.

The delay amount from reproduction of a sound from the speakers 3 to start of a predetermined movement of a virtual object is specifically set as follows.

(1) In Case of User UA

Time taken by sounds reproduced from the speakers 3 to reach the user UA: about 30 msec Delay amount in a case where a virtual object is on the stage 2: 0 msec (since the distance between the speakers 3 and a virtual object is 0 m, and D=0 in (Mathematical Expression 1))

Delay amount of movement start timing in a case where a virtual object is right in front of the user UA: about 30 msec (since the distance between the speakers 3 and a virtual object is 10 m, and D=10 in (Mathematical Expression 1))

(2) In Case of User UB

Time taken by sounds reproduced from the speakers 3 to reach the user UB: about 600 msec Delay amount in a case where a virtual object is on the stage 2: 0 msec (since the distance between the speakers 3 and a virtual object is 0 m, and D=0 in (Mathematical Expression 1))

Delay amount of movement start timing in a case where a virtual object is right in front of the user UB: about 600 msec (since the distance between the speakers 3 and a virtual object is 200 m, and D=200 in (Mathematical Expression 1))

In light of the above, the movement start timing and the like are specifically described.

Figure 6:
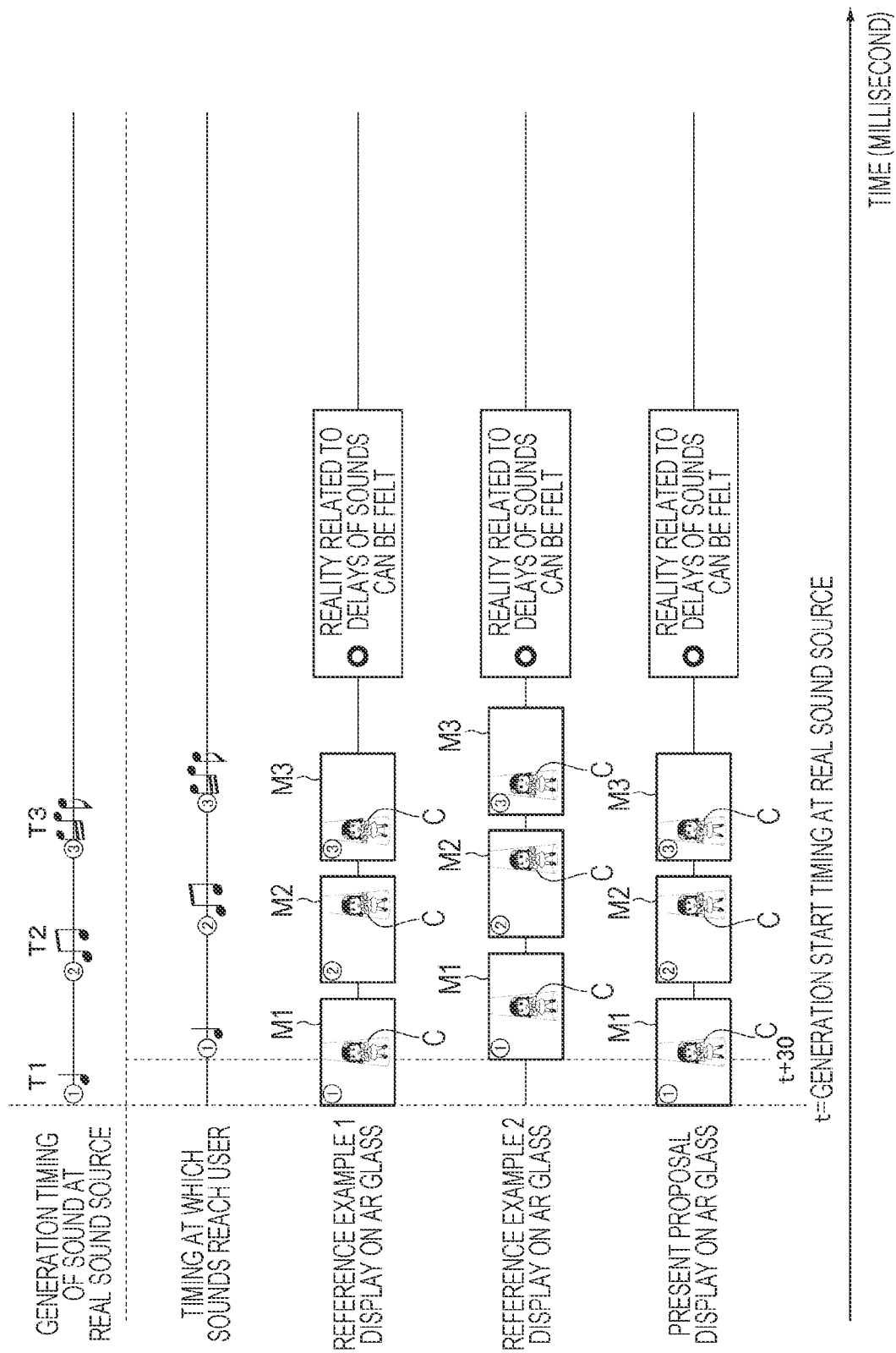
FIG. 6 is a diagram for describing a specific example of processing performed by the reproduction system according to the one embodiment.

FIG. 6 is a timing chart in a case where a user is the user UA who is at a position close to the speakers 3 and the position of a virtual object C is on the stage 2. As an example of timing of sounds reproduced from the speakers 3 as a real sound source, timing T1, T2, and T3 is defined in chronological order. In a case where delays of the sounds and the like are not considered, the virtual object C performs a predetermined movement at the timing T1. In a case where timing of a sound at which the predetermined movement is performed is timing t (t=T1 in the example), the sound reproduced from the speakers 3 reaches the user UA after (t+30) msec. Note that the movement performed by the virtual object C is an example of movements including movements M1, M2, and M3. Furthermore, in FIG. 6 and the like, marks of the same note indicate the same sound.

In order to facilitate understanding of processing performed in the present embodiment (hereinafter also referred to as a present proposal), reference examples 1 and 2 are described together with the present proposal. The reference example 1 is an example in which movement start timing always coincides with reproduction timing of predetermined sounds. The reference example 2 is an example in which movement start timing always coincides with timing at which the predetermined sounds reach the user UA.

As illustrated in FIG. 6, in the reference example 1, the virtual object C starts the movement M1 at timing t at which a sound is reproduced from the speakers 3, and subsequently performs the movements M2 and M3. That is, the movement start timing is set to the timing t. In this case, although there is a difference of 30 msec between the timing at which the sounds reach the user UA and the movement start timing, the difference of 30 msec is a difference to an extent that users do not feel uncomfortable audibly, and thus, reality related to delays of sounds can be achieved according to the reference example 1.

Furthermore, in the reference example 2, the virtual object C starts the movement M1 at timing (t+30 msec) at which the sound reproduced from the speakers 3 reaches the user UA, and subsequently performs the movements M2 and M3. That is, the movement start timing is set to the timing (t+30 msec). In this case, the timing at which the sounds reach the user UA coincides with the movement start timing. Since the user UA is at a position close to the stage 2, the reality related to delays of sounds can be achieved according to the reference example 2.

Furthermore, in the present proposal, as described above, a delay amount of the movement start timing is set to 0. Therefore, similarly to the reference example 1, the present proposal can realize the reality related to delays of sounds.

Figure 7:
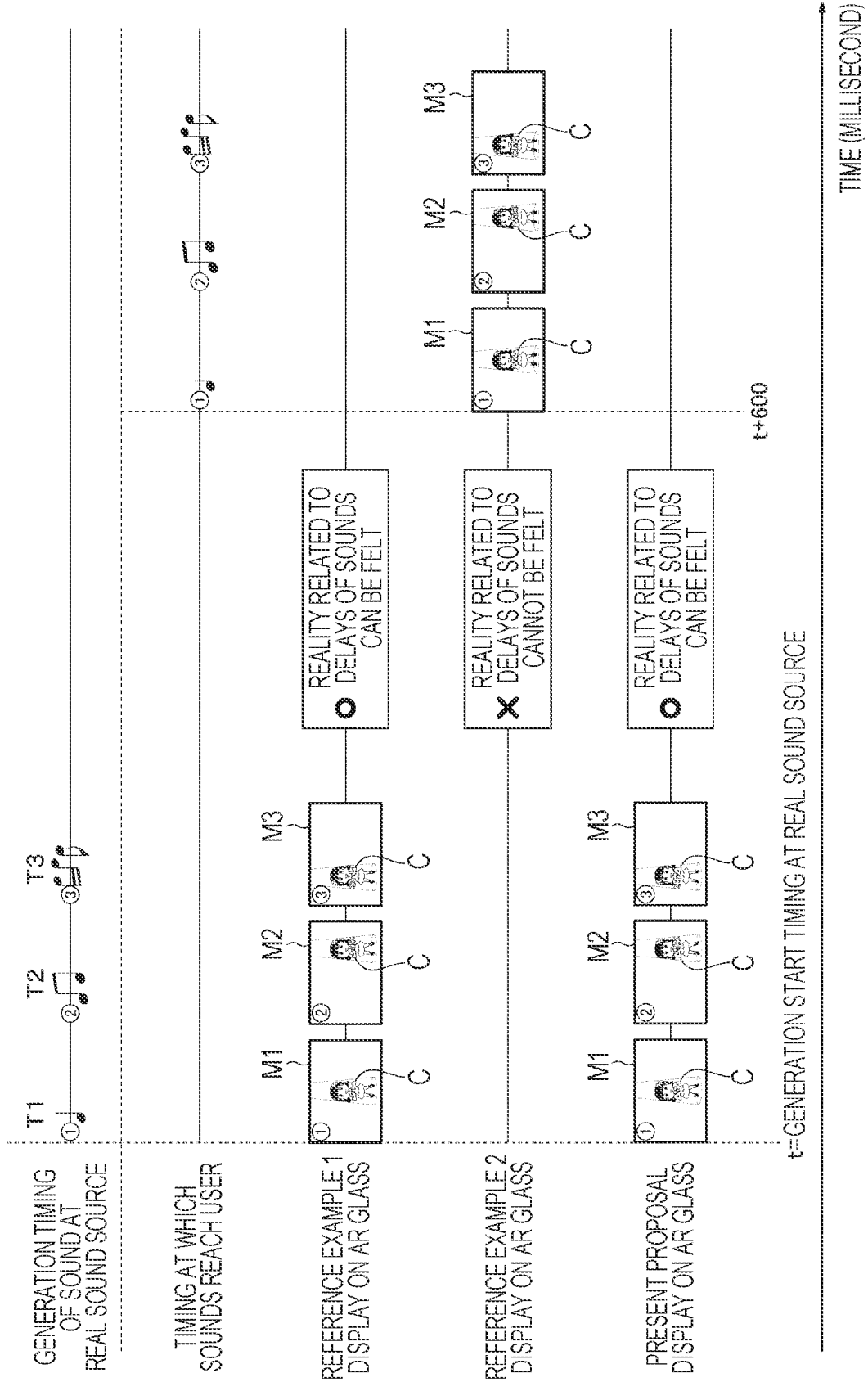
FIG. 7 is a diagram for describing a specific example of processing performed by the reproduction system according to the one embodiment.

FIG. 7 is a timing chart in a case where a user is the user UB who is at a position far from the speakers 3 and the position of the virtual object C is on the stage 2. In this case, the sound reproduced from the speakers 3 reaches the user UB after (t+600 msec).

In the reference example 1, the virtual object C starts the movement M1 at the timing t at which the sound is reproduced from the speakers 3, and subsequently performs the movements M2 and M3. That is, the movement start timing is set to the timing t. Furthermore, the sound reproduced from the speakers 3 reaches the user UB after (t+600 msec). The reality related to delays of sounds can be achieved according to the reference example 1.

In the reference example 2, the virtual object C starts the movement M1 at the timing (t+600 msec) at which the sound reproduced from the speakers 3 reaches the user UB, and subsequently performs the movements M2 and M3. In the reference example 2, the timing at which the sounds reach the user UB coincides with the movement start timing, although the sounds that are audibly recognized should reach the user UB later than a video that is visually recognized. Therefore, the reality related to delays of sounds cannot be achieved according to the reference example 2.

According to the present proposal, since the virtual object is on the stage 2, the delay amount is set to 0, that is, the movement start timing is set to the timing t. Furthermore, the sound reproduced from the speakers 3 reaches the user UB after (t+600 msec). Therefore, the reality related to delays of sounds can be achieved according to the present proposal.

Figure 8:
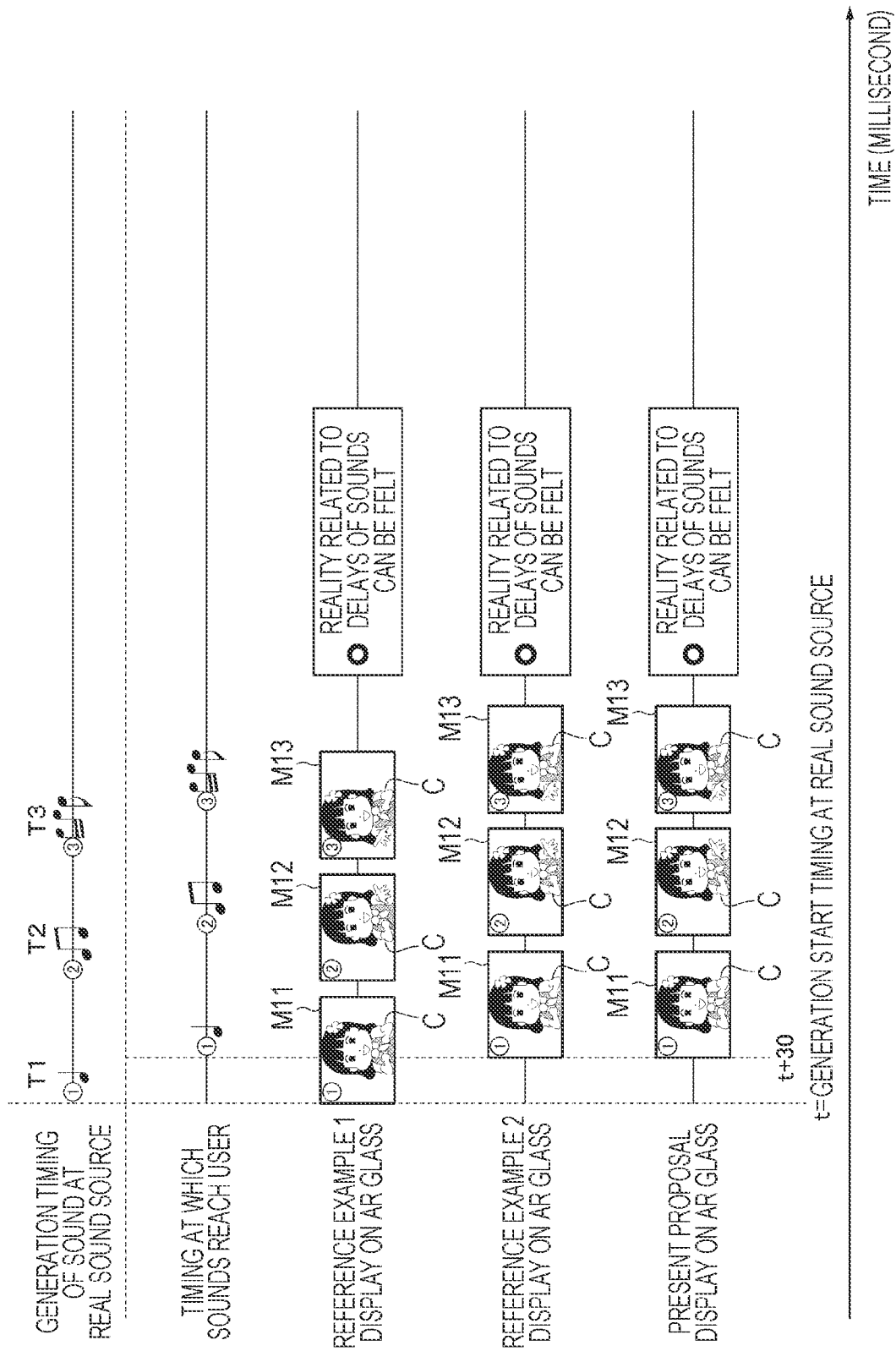
FIG. 8 is a diagram for describing a specific example of processing performed by the reproduction system according to the one embodiment.

FIG. 8 is a timing chart in a case where a user is the user UA who is at a position close to the speakers 3 and the position of the virtual object C is right in front of the user. Since the virtual object C is an object displayed on a smart display, the position of the virtual object C can be freely varied in content, unlike an actual live. For example, the virtual object C can be displayed as if the virtual object C flies from the stage 2 to a position right in front of the user UA. In this case, as described above, since the virtual object C is right in front of the user, the reality related to delays of sounds can be felt when the movement start timing coincides with the timing at which the sound is heard by the user UA.

In the reference example 1, the virtual object C starts the movement M11 at the timing t at which the sound is reproduced from the speakers 3, and subsequently performs the movements M12 and M13. That is, the movement start timing is set to the timing t. In this case, the timing at which the sound reaches the user UA substantially coincides with the movement start timing to an extent that a sense of discomfort does not occur audibly (difference of 30 msec). Therefore, according to the reference example 1, the reality related to delays of sounds can be achieved.

Furthermore, in the reference example 2, the virtual object C starts the movement M11 at the timing (t+30 msec) at which the sound reproduced from the speakers 3 reaches the user UA, and subsequently performs the movements M12 and M13. That is, the movement start timing is set to the timing (t+30 msec). In this case, the timing at which the sound reaches the user UA coincides with the movement start timing. In light of the above, according to the reference example 2, the reality related to delays of sounds can be achieved.

Furthermore, in the present proposal, as described above, the movement start timing is set to (t+30 msec). Therefore, similarly to the reference example 2, the reality related to delays of sounds can be achieved according to the present proposal.

Figure 9:
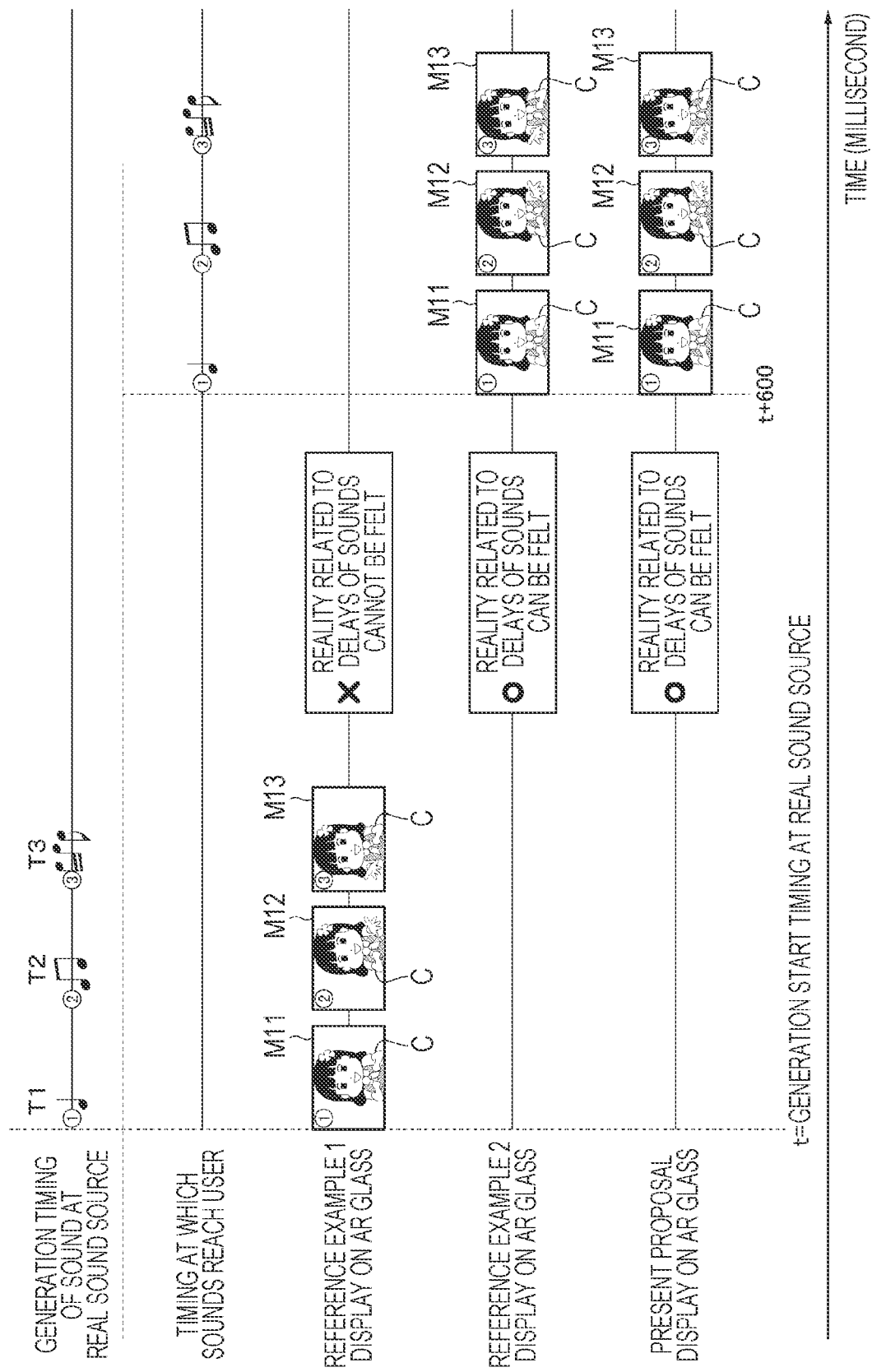
FIG. 9 is a diagram for describing a specific example of processing performed by the reproduction system according to the one embodiment.

FIG. 9 is a timing chart in a case where a user is the user UB who is at a position far from the speakers 3 and the position of the virtual object C is right in front of the user.

In this case, the sound reproduced from the speakers 3 reaches the user UP after (t+600 msec). As described above, since the virtual object C is right in front of the user, the reality related to delays of sounds can be felt when the movement start timing coincides with the timing at which the sound is heard by the user UB.

In the reference example 1, the virtual object C starts the movement M11 at the timing t at which the sound is reproduced from the speakers 3, and subsequently performs the movements M12 and M13. That is, the movement start timing is set to the timing t. On the other hand, the sound reaches the user UB after (t+600 msec), and the user UB recognizes the sound. Therefore, according to the reference example 1, the reality related to delays of sounds cannot be achieved.

Furthermore, in the reference example 2, the virtual object C starts the movement M11 at the timing (t+600 msec) at which the sound reproduced from the speakers 3 reaches the user UB, and subsequently performs the movements M12 and M13. Since the timing at which the sound is heard by the user UB coincides with the movement start timing, the reality related to delays of sounds can be achieved according to the reference example 2.

Furthermore, in the present proposal, as described above, since the movement start timing is set to (t+600 msec), the timing at which the sound is heard by the user UB coincides with the movement start timing. Therefore, similarly to the reference example 2, the reality related to delays of sounds can be achieved in the present proposal.

Figure 10:
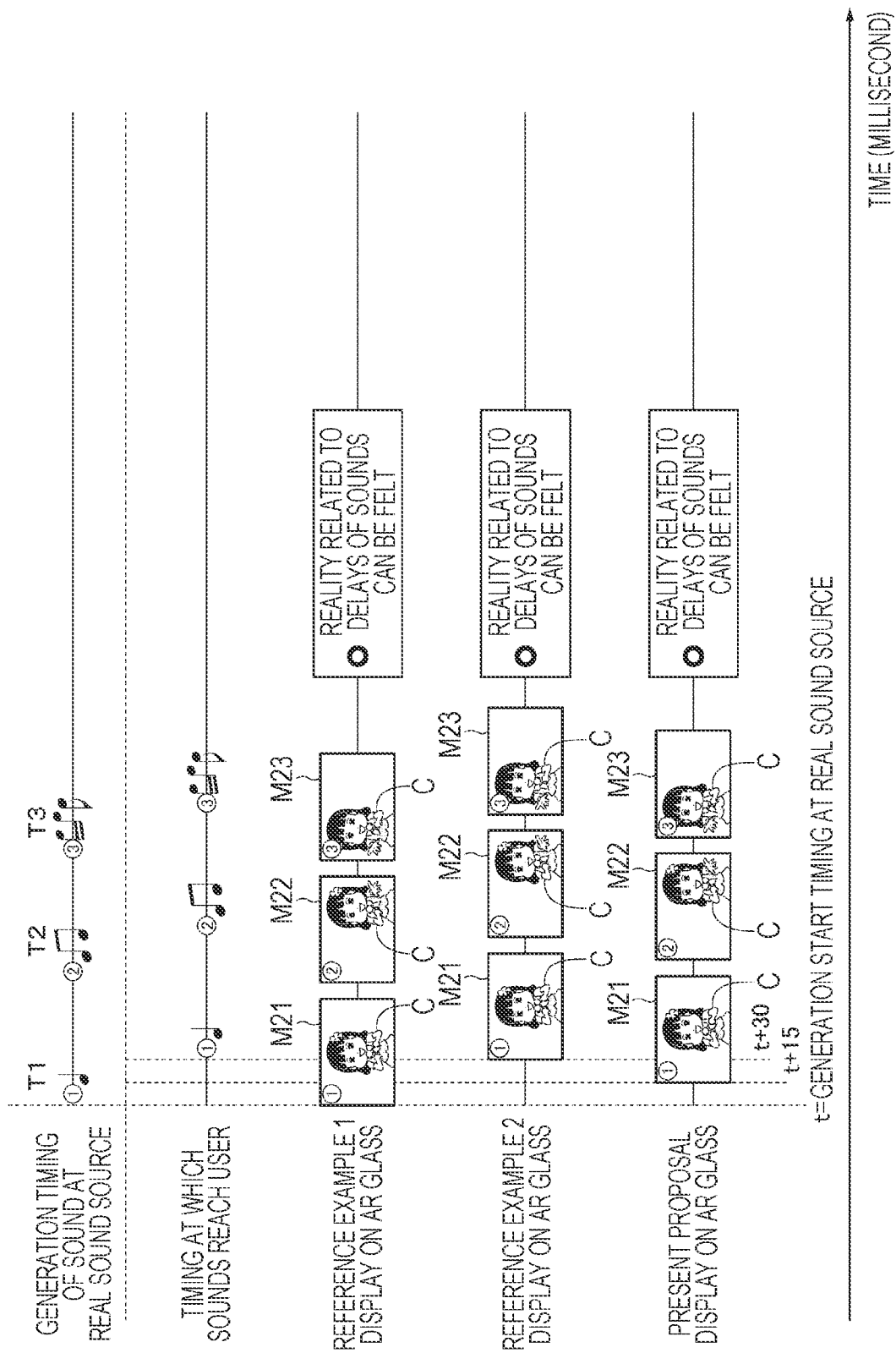
FIG. 10 is a diagram for describing a specific example of processing performed by the reproduction system according to the one embodiment.

FIG. 10 is a timing chart in a case where a user is the user UA who is at a position close to the speakers 3 and the position of the virtual object C is in the middle between the speakers 3 and the user UA (a case where the distance between the position of the speakers 3 and the position of the virtual object C is 5 m). Since the position of the virtual object C can be regarded as substantially the same as the position on the stage 2, the reality related to delays of sounds can be felt when the timing at which the sound is heard substantially coincides with the movement timing.

In the reference example 1, the timing t is the movement start timing. Therefore, the reality related to delays of sounds can be achieved. According to the reference example 2, the movement start timing is set to the timing (t+30 msec). As described above, since it is considered that the difference of 30 msec does not substantially affect audibly, the reality related to delays of sounds can also be achieved according to the reference example 2.

In the present proposal, by substituting D=5 in (Mathematical Expression 1), the set delay amount is calculated to be 15 msec. The movement start timing is set to timing (t+15 msec). Since it is considered that the difference of 15 msec does not substantially affect audibly, the reality related to delays of sounds can also be achieved according to the present proposal. When the movement start timing comes, a video in which the virtual object C performs a series of movements M21, 22, and 23 is rendered on an AR glass 11A.

FIG. 11 is a timing chart in a case where a user is the user UB who at a position far from the speakers 3 and the position of the virtual object C is in the middle between the speakers 3 and the user UA (a case where the distance between the position of the speakers 3 and the position of the virtual object C is 100 m, and the distance between the virtual object C and the user UB is 100 m). In this case, since the distance between the virtual object C and the user UB is 100 m, the reality related to delays of sounds can be felt when the sounds reach the user UB 300 msec after the virtual object C is reproduced.

In the reference example 1, the movement start timing is set to t. Then, the sound reproduced from the speakers 3 reaches the user UB after 600 msec from t. Therefore, reality related to delays of sounds is not felt in the reference example 1.

In the reference example 2, the movement start timing is set to (t+600 msec). The timing at which the sound reaches the user UB coincides with the movement start timing. Therefore, reality related to delays of sounds is not felt in the reference example 2.

In the present proposal, by substituting D=100 in (Mathematical Expression 1), the set delay amount is calculated to be 300 msec. The movement start timing is set to timing (t+300 msec). Then, the sound reaches the user UB after 300 msec from the timing (t+300 msec). Therefore, the reality related to delays of sounds is felt in the present proposal. When the movement start timing comes, a video in which the virtual object C performs a series of the movements M21, 22, and 23 is rendered on an AR glass 11B.

FIG. 12 is a table in which results of the specific processing described above are summarized. In the table, o marks indicate that the reality related to delays of sounds can be achieved. Furthermore, in the table, x marks indicate that the reality related to delays of sounds cannot be achieved. In comparison with the reference examples 1 and 2, the reality related to delays of sounds can be achieved in any cases according to the present proposal.

Figure 13:
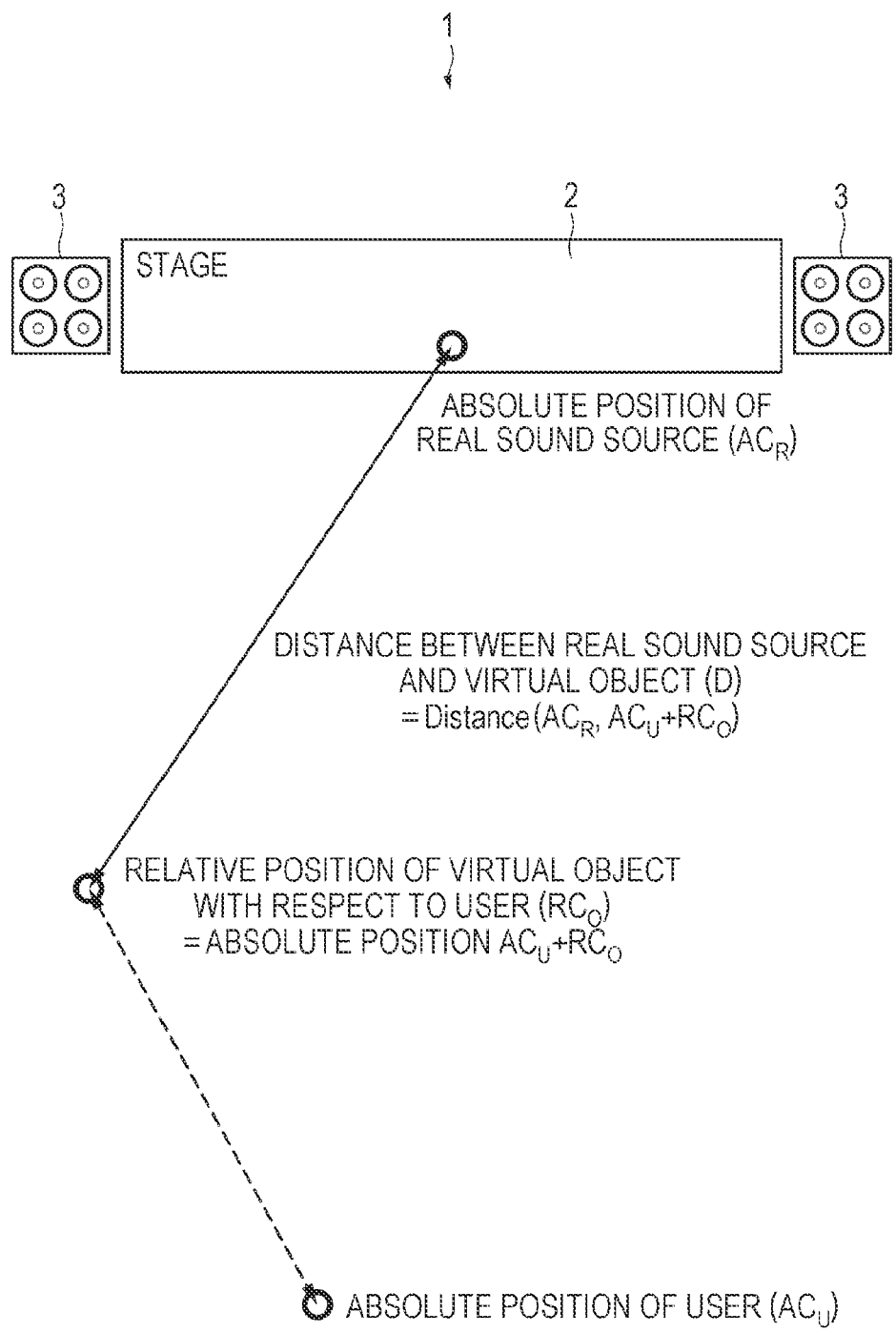
FIG. 13 is a diagram to be referred to when an example of a mathematical expression for calculation used for obtaining a delay amount of movement start timing is described in one embodiment.

FIG. 13 is a diagram for describing parameters necessary for setting a delay amount of movement start timing and an example of calculations using the parameters.

As illustrated in FIG. 13, the following expressions are provided:

absolute coordinates of a virtual object: $AC_U + RC_O$; and distance between a real sound source (speakers 3) and the virtual object: Distance $(AC_R, AC_U + RC_O) * \alpha$(m), where position on the three-dimensional coordinate space (absolute coordinates) of the real sound source (speakers 3) associated with the real space: $AC_R$, position on the three-dimensional coordinate space (absolute coordinates) of a user associated with the real space: $AC_U$, relative coordinates of the virtual object with respect to the position of the user: $RC_O$, transform coefficient of the distance between the coordinates and a measured distance (m): $\alpha$. Then, a delay amount of the movement start timing can be expressed as follows.

$$\text{Distance} \quad (AC_R, AC_U + RC_O) * \alpha *$$
$$1000/340 \text{ (msec)} \quad \text{(Mathematical Expression 2)}$$

Configuration Example of System

Figure 14:
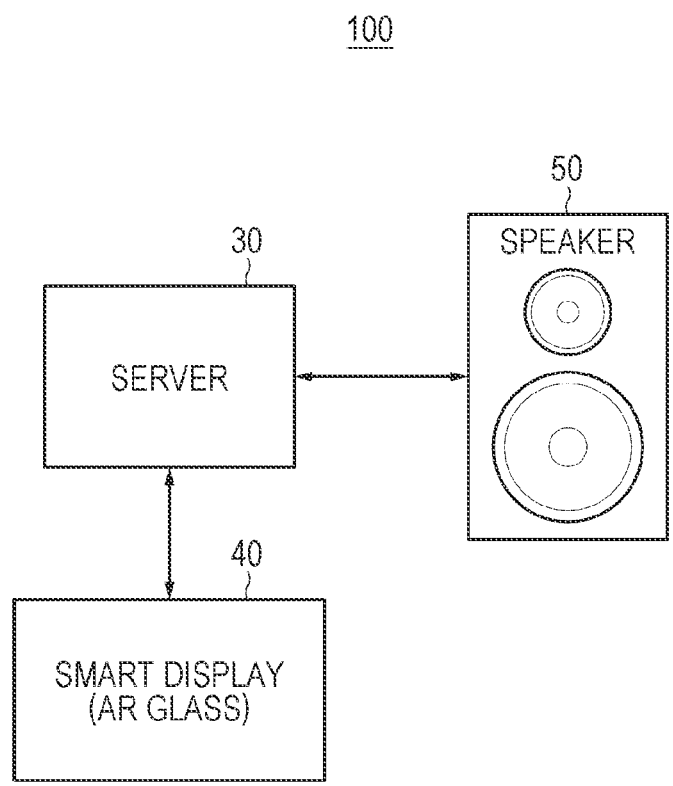
FIG. 14 is a diagram illustrating a configuration example of a system including a plurality of deices in the one embodiment.

FIG. 14 is a diagram illustrating a configuration example of a system (system 100) including a plurality of devices in the one embodiment. The system 100 includes, for example, a server 30, a smart display (for example, the AR glasses 11A and 11B described above) 40, and a speaker (for example, the speakers 3 described above) 50. Various types of data and commands can be exchanged between the devices by communication.

Configuration Example of Each Device

Configuration Example of Server

Figure 15:
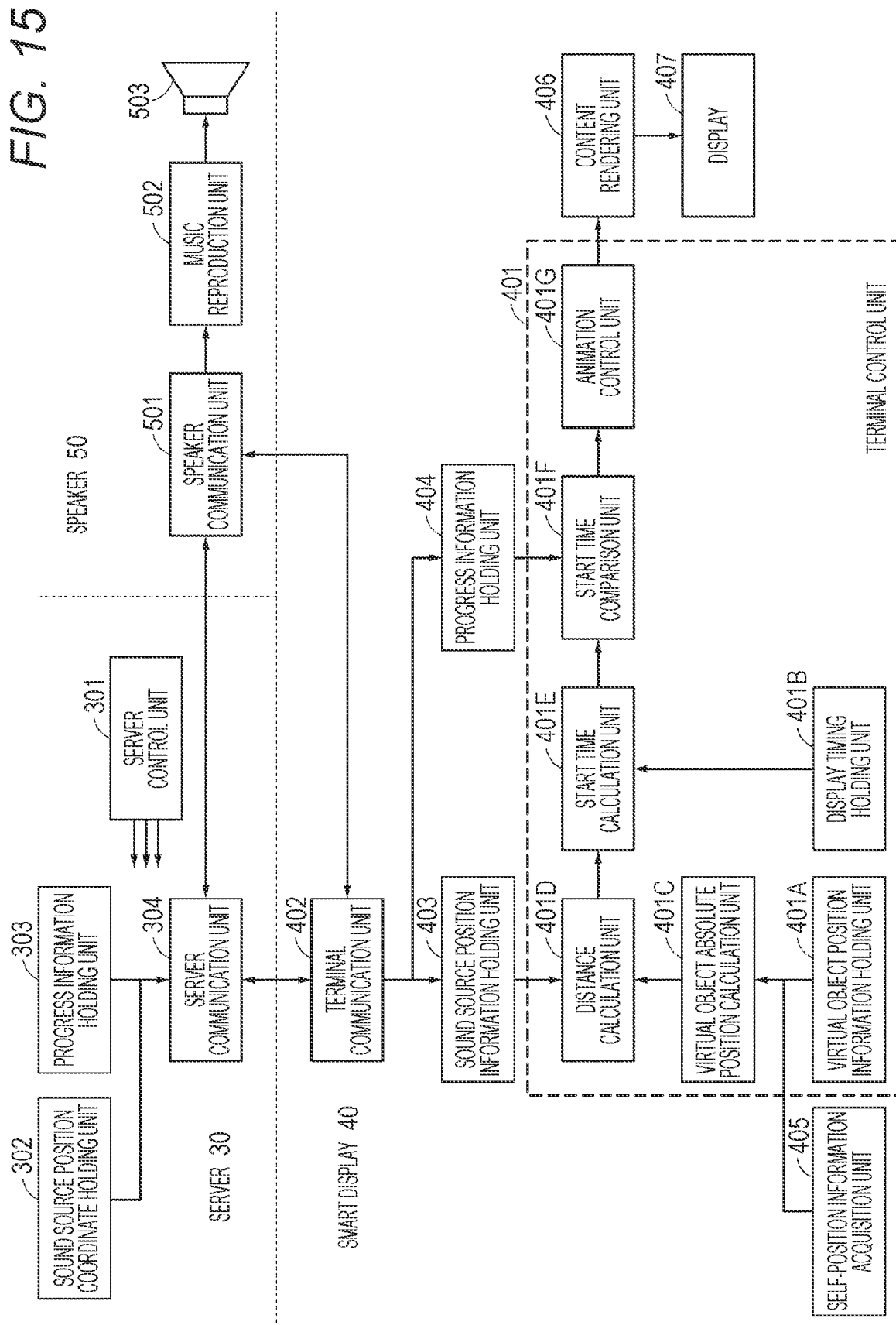
FIG. 15 is a diagram for describing respective configuration examples of a server, a smart display, and a speaker according to the one embodiment.

Each configuration example of the server 30, the smart display 40, which is an example of the information processing device, and the speaker 50 according to the present embodiment is described with reference to FIG. 15.

The server 30 includes, for example, a server control unit 301, a sound source position coordinate holding unit 302, a progress information holding unit 303, and a server communication unit 304. The server control unit 301 integrally controls each of the units of the server 30. Processing performed by the server 30 to be described below is performed under the control of the server control unit 301 unless otherwise specified.

The sound source position coordinate holding unit 302 is a memory that holds a position (absolute position), of the speaker 50, which is an example of the real sound source, on a three-dimensional coordinate space associated with a real space. The progress information holding unit 303 is a memory that holds content progress information (for example, reproduction time). Note that the sound source position coordinate holding unit 302 and the progress information holding unit 303 may be the same memory or different memories.

The server communication unit 304 is configured to communicate with the smart display 40 and the speaker 50, and includes a modulation/demodulation circuit, an antenna, and the like compatible with a communication standard. The server communication unit 304 may be a communication unit compatible with a network such as the Internet, may be a communication unit compatible with short-distance wireless communication such as a local area network (LAN), or may be a communication unit compatible with both of them.

Configuration Example of Smart Display

The smart display 40 includes a terminal control unit 401, a terminal communication unit 402, a sound source position information holding unit 403, a progress information holding unit 404, a self-position information acquisition unit 405, a content rendering unit 406, and a display 407.

The terminal control unit 401 integrally controls the entire smart display 40. The terminal control unit 401 includes, for example, a virtual object position information holding unit 401A, a display timing holding unit 401B, a virtual object absolute position calculation unit 401C, a distance calculation unit 401D, a start time calculation unit 401E, a start time comparison unit 401F, and an animation control unit 401G.

The virtual object position information holding unit 401A holds position information of a virtual object. Furthermore, the display timing holding unit 401B holds display timing set as default for a virtual object. Note that the position information and the display timing of a virtual object are acquired, for example, when an application including video content is installed in the smart display 40. The position information and the display timing of a virtual object may be acquired by communication or the like. The position information and the display timing of a virtual object are defined in chronological order. The position information of a virtual object is information defined as a relative position with respect to the position of the smart display 40. Furthermore, the display timing of a virtual object is timing at which a video in which the virtual object performs a predetermined movement is displayed, and is defined in correspondence with the lapse of the reproduction time of video content. The position information of a virtual object is supplied from the virtual object position information holding unit 401A to the virtual object absolute position calculation unit 401C. The display timing of a virtual object is supplied from the display timing holding unit 401B to the start time calculation unit 401E.

The virtual object absolute position calculation unit 401C calculates the absolute position of a virtual object on the basis of the position information of the virtual object and the position information of the smart display 40 supplied from the self-position information acquisition unit 405. The absolute position of a virtual object is a predetermined position on a three-dimensional coordinate space associated with a real space. A virtual object is displayed (rendered) at the position of the display 407 corresponding to the absolute position calculated by the virtual object absolute position calculation unit 401C.

The distance calculation unit 401D calculates the distance between the speaker 50 and a virtual object on the basis of sound source position information that is the absolute position of the speaker 50 and is transmitted from the server 30 and the absolute position of the virtual object supplied from the virtual object absolute position calculation unit 401C.

The start time calculation unit 401E calculates a start time, that is, movement start timing at which a virtual object is caused to perform a predetermined movement. More specifically, the start time calculation unit 401E performs delay amount setting processing of increasing a delay amount of the movement start timing at which a virtual object is caused to perform a predetermined movement with respect to the reproduction timing at which the speaker 50 reproduces a predetermined sound as the position of the speaker 50 in the real space and the position of the virtual object on the three-dimensional coordinate space are separated from each other. The movement start timing calculated by the start time calculation unit 401E is supplied to the start time comparison unit 401F.

The start time comparison unit 401F determines whether or not the timing defined by the movement start timing exceeds the time indicated by progress information (hereinafter referred to as a progress time as appropriate) on the basis of the progress information supplied from the progress information holding unit 404 and the movement start timing started from the start time calculation unit 401E. In a case where the movement start timing exceeds the progress time, the start time comparison unit 401F notifies the animation control unit 401G of the effect.

In a case where the movement start timing exceeds the progress time, the animation control unit 401G generates an animation in which a virtual object performs a series of predetermined movements. The animation generated by the animation control unit 401G is supplied to the content rendering unit 406.

The terminal communication unit 402 communicates with an external device such as the server 30. Through the communication performed by the terminal communication unit 402, the smart display 40 acquires sound source position information and progress information supplied from the server 30. The sound source position information acquired by the performance of the terminal communication unit 402 is held (stored) in the sound source position information holding unit 403, and the progress information is held in the progress information holding unit 404. The sound source position information held in the sound source position information holding unit 403 is supplied to the distance calculation unit 401D. Furthermore, the progress information held in the progress information holding unit 404 is supplied to the start time comparison unit 401F.

The self-position information acquisition unit 405 as a position information acquisition unit acquires self-position information that is the current position of the smart display 40. The self-position information may be directly input by a user, or may be acquired by a user performing an operation of reading a QR code (registered trademark) assigned to the position where the user is (a seat or the like). Furthermore, the self-position information may be acquired via a position sensor such as a global navigation satellite system (GNSS), or may be acquired by a self-position being estimated using simultaneous localization and mapping (SLAM) or a feature amount map obtained by imaging in advance. The position of a user holding the smart display 40 may vary (variable). In this case, the self-position information also varies according to the variation in the user position.

The content rendering unit 406 performs processing of rendering an animation supplied from the animation control unit 401G on the display 407. Specifically, a virtual object singing on the stage 2 or a virtual object flying around in the venue is rendered on the display 407. As a result, a user visually recognizes the virtual object displayed on the display 407.

The display 407 is, for example, an optical see-through display. A user recognizes a virtual object displayed on the display 407 while visually recognizing real objects such as the stage 2 via the display 407.

Configuration Example of Speaker

The speaker 50 includes a speaker communication unit 501, a music reproduction unit 502, and a speaker unit 503. The speaker communication unit 501 communicates with the server 30 and the smart display 40. The speaker communication unit 501 receives, for example, a sound reproduction command transmitted from the server 30 or the smart display 40.

The music reproduction unit 502 performs known sound signal processing for reproducing music data. Note that music data may be stored in an appropriate memory of the speaker 50, or may be acquired by communication via the speaker communication unit 501. The music data processed by the music reproduction unit 502 is reproduced from the speaker unit 503.

Note that in a case where a plurality of virtual objects is included in video content, the position information and the display timing are defined for each of the virtual objects. Furthermore, processing to be described below is also performed for each of the virtual objects. The display timing is not necessarily set, and a virtual object may be programmed to perform a predetermined movement in advance.

The progress information may be managed by the smart display 40 instead of the server 30. Furthermore, the smart display 40 may not acquire the progress information from the server 30, but may acquire current progress information by using marker recognition, recognition by a camera using a feature amount map, or an audio Fingerprint. Furthermore, sound source position information of the speaker 50 may be directly supplied from the speaker 50 to the smart display 40.

Flow of Processing

Figure 16:
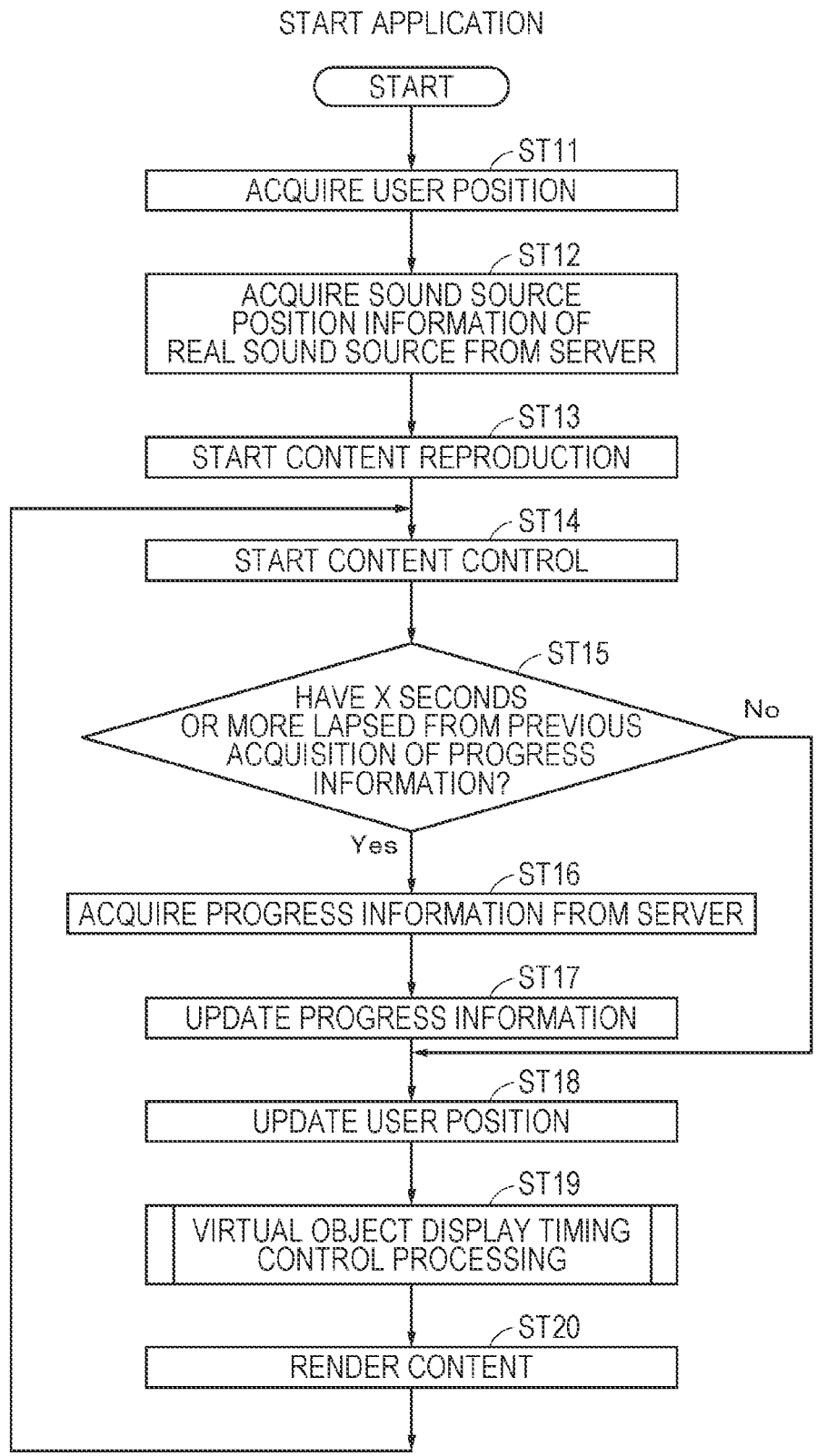
FIG. 16 is a flowchart to be referred to when a flow of processing performed in the one embodiment is described.
Figure 17:
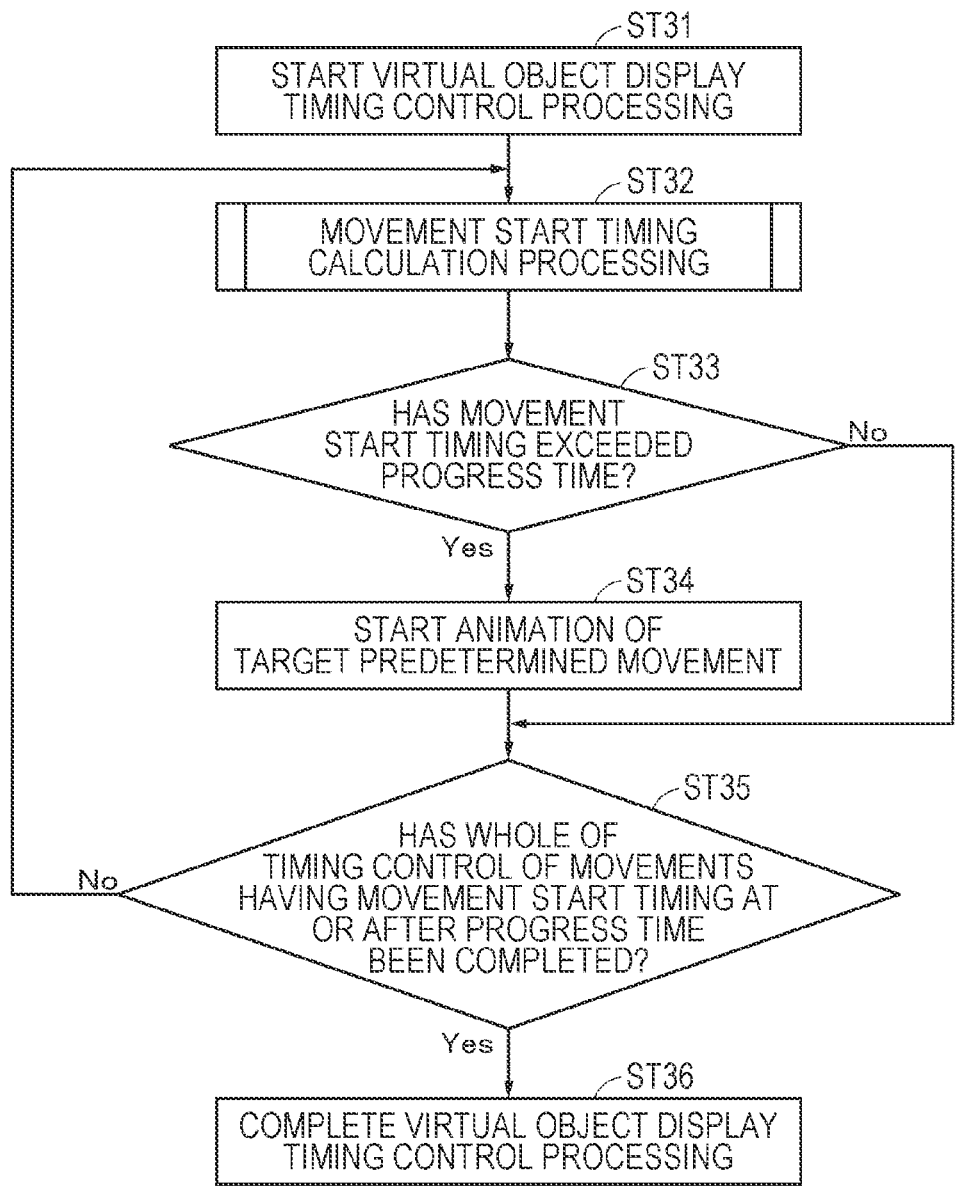
FIG. 17 is a flowchart to be referred to when a flow of processing performed in the one embodiment is described.
Figure 18:
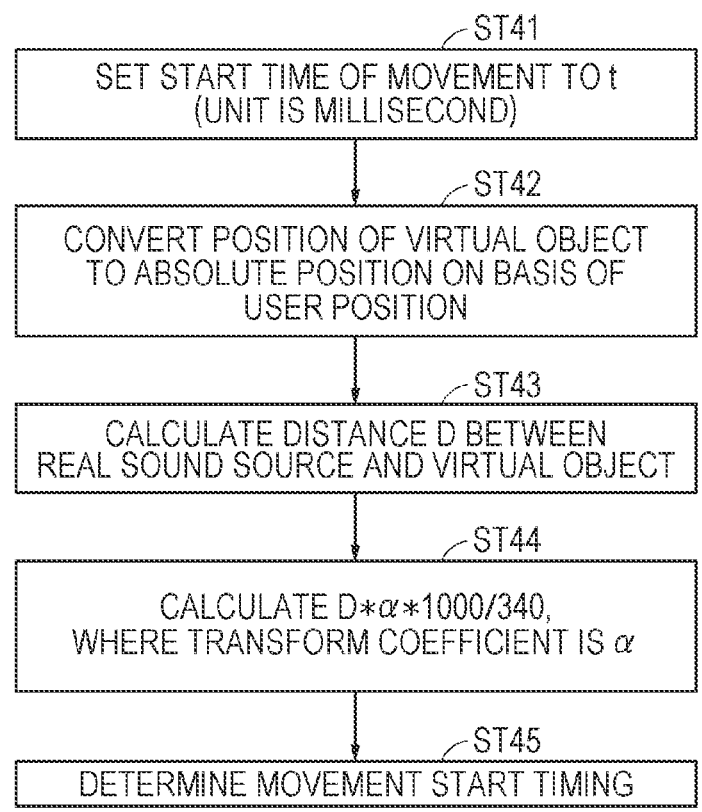
FIG. 18 is a flowchart to be referred to when a flow of processing performed in the one embodiment is described.

Next, a flow of processing performed in the present embodiment (processing mainly performed in the smart display 40) is described with reference to FIGS. 16, 17, and 18. FIG. 16 is a flowchart illustrating a flow of the overall processing. FIG. 17 is a flowchart illustrating a flow of virtual object display timing control processing in FIG. 16. FIG. 18 is a flowchart illustrating a flow of movement start timing calculation processing in FIG. 17. Note that in the following description, it is assumed that an application used for performing the processing according to the present embodiment is installed in the smart display 40.

In step ST11 in the flowchart illustrated in FIG. 16, a user position, in other words, the position of the smart display 40 held or worn by a user is acquired by the self-position information acquisition unit 405. As described above, the user position may be input by a user operation or may be acquired by a sensor or the like. Then, the processing proceeds to step ST12.

In step ST12, sound source position information of the speaker 50 that is an example of a real sound source is acquired from the server 30, and the acquired sound source position information is held in the sound source position information holding unit 403. Then, the processing proceeds to step ST13.

In step ST13, content starts to be reproduced. The content reproduction is started by, for example, a command from the server 30 in response to a content reproduction operation on the smart display 40. When the content reproduction command from the server 30 is supplied to the speaker 50, music data is reproduced from the speaker unit 503. When the content reproduction is started, the smart display 40 periodically acquires progress information from the server 30. Then, the processing proceeds to step ST14.

In step ST14, control related to the content reproduction is performed along with the content reproduction. Then, the processing proceeds to step ST15.

In step ST15, whether or not X seconds or more have lapsed from the previous acquisition of the progress information is determined. Such determination is performed, for example, by the term anal control unit 401. For example, the terminal control unit 401 determines whether or not X seconds have lapsed from the progress information held in the progress information holding unit 404 is updated to the progress information transmitted from the server 30. X seconds can be set to several seconds to 5 seconds or the like as appropriate. If X seconds have not lapsed from the previous acquisition of the progress information, the processing proceeds to step ST18. If X seconds have lapsed from the previous acquisition of the progress information, the processing proceeds to step ST16.

In step ST16, the smart display 40 acquires progress information from the server 430. Then, the processing proceeds to step ST17.

In step ST17, the progress information is updated when the progress information holding unit 404 holds the progress information acquired in the processing according to step ST16. Then, the processing proceeds to step ST18.

In the present embodiment, a user position may vary. When a user position varies, the processing according to step ST18 is performed to supply a new user position from the self-position information acquisition unit 405 to the terminal control unit 401, so that the user position is updated. Then, processing based on the updated user position is performed. Then, the processing proceeds to step ST19.

In step ST19, virtual object display timing control processing is performed. The details of the virtual object display timing control processing are described below. Movement start timing of a virtual object is obtained by the virtual object display timing control processing. Then, the processing proceeds to step ST20.

In step ST20, a virtual object that performs a predetermined movement according to the lapse of the movement start timing is rendered on the display 407. Note that in a case where there is a virtual object that does not depend on the movement start timing, the virtual object is, for example, always rendered on the display 407 while content is reproduced.

Next, the flow of the virtual object display timing control processing in the present embodiment is described with reference to the flowchart of FIG. 17.

For example, after the processing according to step ST18 illustrated in FIG. 16 is performed, the virtual object display timing control processing is started in step ST31. Then, the processing proceeds to step ST32.

In step ST32, movement start timing calculation processing is performed. The movement start timing of a virtual object is obtained by the movement start timing calculation processing. Note that the details of the movement start timing calculation processing are described below. The processing then proceeds to step ST33.

In step ST33, the start time comparison unit 401F determines whether or not the movement start timing has exceeded the progress time by comparing the movement start timing obtained in step ST32 with the progress time. In a case where the movement start timing has not exceeded the progress time, the processing proceeds to ST35. In a case where the movement start timing has exceeded the progress time, the processing proceeds to step ST34.

In step ST34, an animation of the target predetermined movement by the virtual object is started. Such processing is performed by the animation control unit 401G. Then, the processing proceeds to step ST35.

In step ST35, the terminal control unit 401 determines whether or not whole of the timing control of the movements having the movement start timing at or after the progress time has been completed. In a case where whole of the timing control of the movements has not been completed, the processing returns to step ST32. In a case where whole of the timing control of the movements has been completed, the processing proceeds to step ST36.

In step ST36, the virtual object display timing control processing is completed. Subsequently, the processing according to step ST20 illustrated in FIG. 16 is performed, and a video of the virtual object performing the predetermined movement generated by the animation control unit 401G is displayed on the display 407.

Next, the flow of the movement start timing calculation processing in the present embodiment is described with reference to the Flowchart of FIG. 18.

In step ST41, the start time of the predetermined movement performed by the virtual object performs is set to t seconds (the unit is millisecond) after the reproduction starts. The value of t is defined by the installed application. Then, the processing proceeds to step ST42.

In step ST42, the position of the virtual object is converted to the absolute position that is a position on a three-dimensional coordinate space associated with a real space on the basis of the user position. That is, the relative position of the virtual object with respect to the smart display 40 defined by the application is converted to an absolute position on the basis of the position of the smart display 40 supplied from the self-position information acquisition unit 405. Then, the processing proceeds to step ST43.

In step ST43, the distance D between the absolute position of the virtual object calculated in step ST42 and the position indicated by sound source position information of the speaker 50 is calculated by the distance calculation unit 401D. Then, the processing proceeds to step ST44.

In step ST44, the start time calculation unit 401E performs delay amount setting processing of calculating a delay amount based on (Mathematical Expression 2) described above. As described above, in the delay amount setting processing, the delay amount is set to be larger as the distance D is larger. Then, the processing proceeds to step ST45.

In step ST45, the movement start timing is determined by adding the delay amount to t defined in advance. Then, processing of step ST33 and subsequent processing illustrated in FIG. 17 is performed Note that the processing such as the delay amount setting processing described above is performed for each virtual object or for each series of the movements of the virtual object.

According to the present embodiment described above, movement start timing in which a virtual object is caused to perform a predetermined movement can be set as appropriate.

MODIFICATIONS

Although the one embodiment of the present disclosure has been specifically described above, the content of the present disclosure is not limited to the above-described embodiment, and various modifications based on the technical idea of the present disclosure can be made. Hereinafter, modifications are described.

Modification 1

Predetermined synchronization information may be set for content to be reproduced. The synchronization information is, for example, a flag indicating synchronization or asynchronization. For example, in a case of "synchronization", "1" that is a logical value is set as synchronization information, and in a case of "asynchronization", "0" that is a logical value is set as synchronization information. Of course, the logical values can be interchanged. The synchronization information is information that can be set for each movement of a virtual object or for each virtual object in a piece of content. For example, there is a scene in which it is desired to show the same video to a plurality of users at the same timing, such as a countdown. In such a case, "1" is set as synchronization information.

Figure 19:
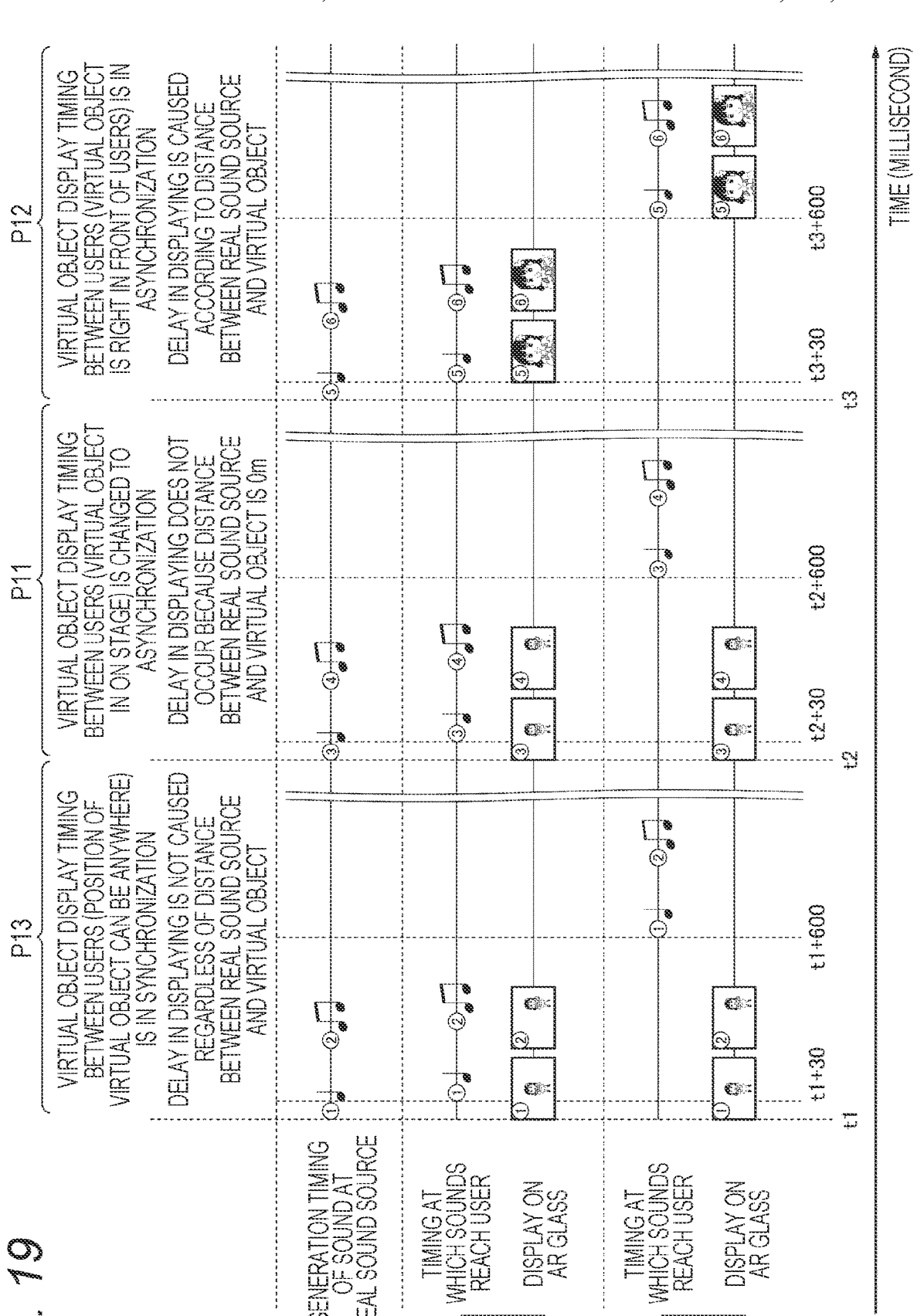
FIG. 19 is a diagram to be referred to when a modification is described.

Processing indicated by patterns P11 and P12 illustrated in FIG. 19 is processing in a case where "0", that is, "asynchronization" is set as synchronization information. In a case where "0" is set as synchronization information, movement start timing of a virtual object is set or the basis of the delay amount setting processing similarly to the above-described one embodiment. Processing indicated by pattern P13 illustrated in FIG. 19 is processing in a case where "1", that is, "synchronization" is set as synchronization information. In a case where "1" is set as synchronization information, synchronization processing for not causing a delay in displaying regardless of the distance between the stage and the virtual object, in other words, for setting the movement start timings of the virtual object for the respective users are set to the same predetermined timing is performed. Such synchronization processing is performed, for example, by control of the terminal control unit 401. By performing the synchronization processing, a video of a predetermined scene can be rendered for a plurality of users at the same timing. This timing is common timing to a predetermined smart display (for example, a smart display held by the user UA) and another smart display operated by the same application (for example, a smart display held by the user UB).

Note that in a case where the synchronization processing is performed, information corresponding to the synchronization processing may be rendered on the display 407. For example, letters of a countdown may be rendered on the display 407 as the information corresponding to the synchronization processing.

Modification 2

Predetermined share information may be set for content to be reproduced. The share information is, for example, a flag indicating share or not-share. For example, in a case of "share", "1" that is a logical value is set as share information, and in a case of "not-share", "0" that is a logical value is set as share information. Of course, the logical values can be interchanged. The share information is information that can be set for each movement of a virtual object or for each virtual object in a piece of content.

In a case where "1" is set as share information, a predetermined movement of a virtual object and the position thereof are shared between users holding smart displays operated by the same application. In a case where "0" is set as share information, the predetermined movement of the virtual object is shared between users, but the position of the virtual object varies depending on each user. A specific example of the latter is, for example, a case where a flying movement of the virtual object is shared between users, but, for example, the position is right in front of the user for the user UA and the position is close to the stage 2 for the user UB.

Figure 20:
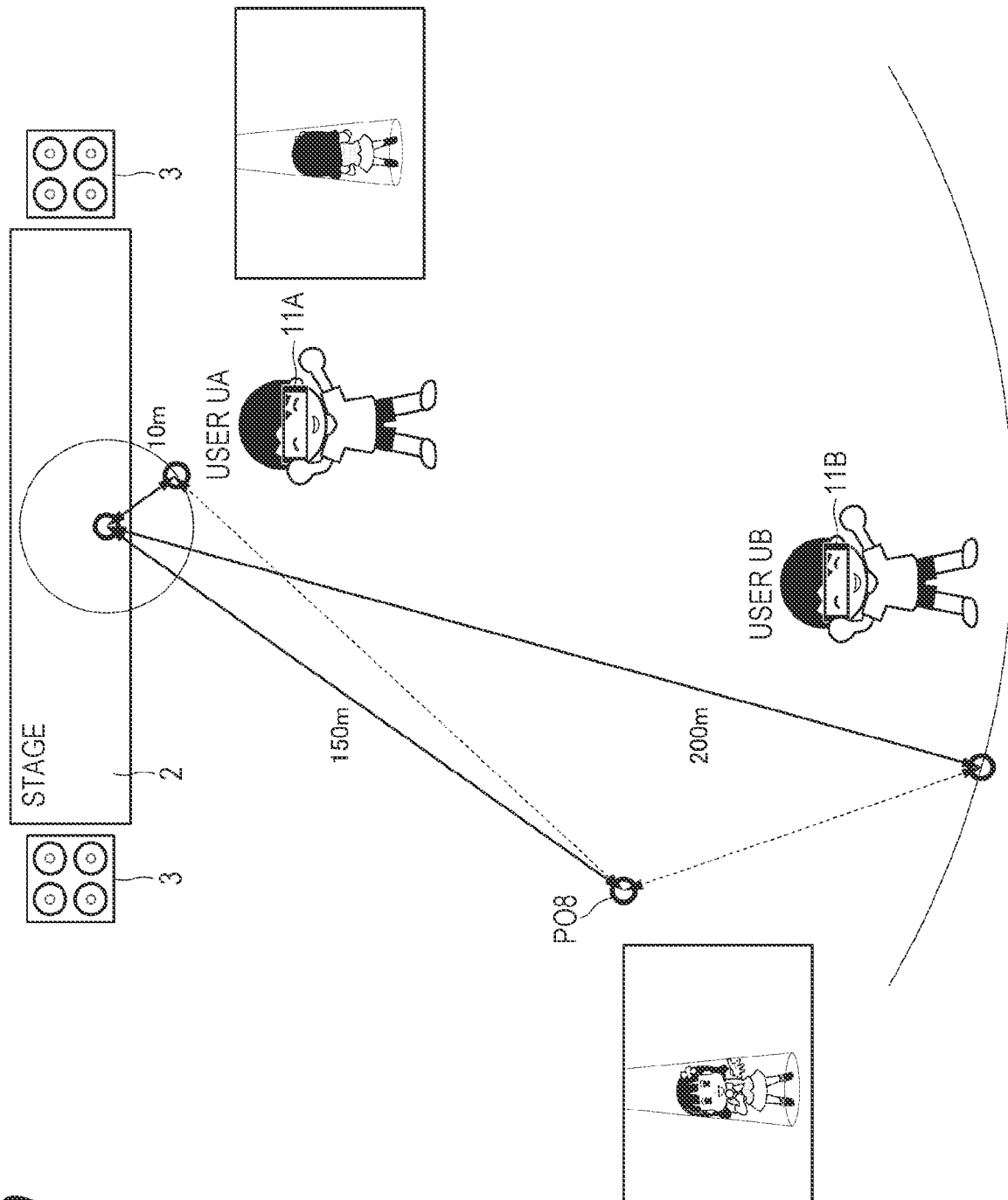
FIG. 20 is a diagram to be referred to when a modification is described.

A specific example in a case where "1" is set as share information is described with reference to FIG. 20. As illustrated in FIG. 20, in a case where a virtual object moves to a position PO8 between the user UA and the user UB (a position of 150 m from the stage 2), a video in which the back side of the virtual object appears is rendered on the smart display of the user UA, and a video in which the front side of the virtual object appears is rendered on the smart display of the user UB. That is, in a case where "share" is set as predetermined share information, the virtual object is rendered in a mode corresponding to the positional relation between the positions of the smart displays and the position of the virtual object on a three-dimensional coordinate space. Furthermore, in a case where not-share is set as predetermined share information, the virtual object is displayed in a mode corresponding to each information processing device.

Note that a delay amount in a case illustrated in FIG. 20 is set in the same manner as a case of not-share, that is, as a case of the one embodiment. Specifically, D is calculated as D=150. Then, in a case of the user UA, a sound of a real sound source reaches the user UA after 30 msec, and the virtual object starts a movement 440 msec after generation of the sounds at the real sound source. Furthermore, in a case of the user UB, the sound of the real sound source reaches the user UB after 30 msec, and the virtual object starts the movement 440 msec after generation of the sounds at the real sound source.

The synchronization information and the share information are set to be the time of content creation. Both the synchronization information and the share information can be set. The synchronization information and the share information may be variable after content creation.

Other Modifications

In the embodiment described above, in a case where a virtual object comes right in front of a user from a stage, movements from jumping out of the stage to coming right in front of the user may be rendered as a series of animations. In that case, the timing of jumping out of the stage is determined in consideration of the time required for moving, or the speed from lumping out of the stage to coming right in front of the user is adjusted as appropriate.

Apart from real audio coming from a real sound source, a user can also simultaneously listen to music reproduced from a smart display by wearing an open earphone. An experience of hearing sounds from a position different from the real sound source can be provided to a user by a sound source localized at the position of the virtual object and reproduced using 3D sounds.

The real sound source may collect sounds in a concert venue using a microphone and reproduce the sounds. The present embodiment can be applied not only to a live event but also to a parade in which a virtual object is updated, and the like.

The configurations, methods, steps, shapes, materials, numerical values, and the like described in the above-described embodiment and modifications are merely examples, and configurations, methods, steps, shapes, materials, numerical values, and the like different from those may be used as necessary, or the configurations, methods, steps, shapes, materials, numerical values, and the like described in the above-described embodiment and modifications can be replaced with known ones. Furthermore, the configurations, methods, steps, shapes, materials, numerical values, and the like in the embodiment and the modifications can be combined with each other within a range in which no technical inconsistencies occur. Furthermore, the present disclosure can be achieved by any form such as a control method and a manufacturing device of an electronic device.

Note that the effects exemplified in the present specification are not to limit the interpretation of the content of the present disclosure.

The present disclosure can also have following configurations.

(1)

An information processing device including
a control unit that displays a virtual object on a three-dimensional coordinate space associated with a real space and causes the virtual object to perform a predetermined movement according to a predetermined sound reproduced from a real sound source disposed in the real space,
in which the control unit performs delay amount setting processing of increasing a delay amount of movement start timing at which the virtual object is caused to perform the predetermined movement with respect to a reproduction timing at which the real sound source reproduces the predetermined sound, as a position of the real sound source in the real space and a position of the virtual object on the three-dimensional coordinate space are separated from each other.

(2)

The information processing device according to (1),
in which the control unit acquires a position of the virtual object on the three-dimensional coordinate space on the basis of a relative position of the virtual object defined with respect to a position of the information processing device.

(3)

The information processing device according to (2),
in which the control unit calculates a distance between a position of the real sound source and a position of the virtual object on the three-dimensional coordinate space, and sets the delay amount on the basis of a result of the calculation (4)

The information processing device according to (3),
in which a position of the real sound source on the three-dimensional coordinate space is supplied from an external device.

(5)

The information processing device according to any one of (2) to (4),
in which a position of the information processing device is variable.

(6)

The information processing device according to any one of (2) to (5) further including a position information acquisition unit that acquires a position of the information processing device.

(7)

The information processing device according to any one of (1) to (6),
in which the control unit performs synchronization processing of setting the movement start timing to predetermined timing regardless of the delay amount.

(8)

The information processing device according to (7),
in which the control unit determines the movement start timing on the basis of the synchronization processing in a case where synchronization is set as predetermined synchronization information, and determines the movement start timing on the basis of the delay amount setting processing in a case where asynchronization is set as predetermined synchronization information.

(9)

The information processing device according to (8),
in which the synchronization information is set for each of a plurality of the virtual objects.

(10)

The information processing device according to (7) or (8),
in which the predetermined timing is common timing to another information processing device operated by the same application.

(11)

The information processing device according to any one of (7) to (10),
in which in a case where the synchronization processing is performed, the control unit displays information corresponding to the synchronization processing.

(12)

The information processing device according to any one of (1) to (12),
in which in a case where share is set as predetermined share information, the control unit displays the virtual object so as to correspond to a positional relation between a position of the information processing device and a position of the virtual object on the three-dimensional coordinate space, and in a case where not-share is set as predetermined share information, the control unit displays the virtual object so as to correspond to each of a plurality of the information processing devices.

(13)

The information processing device according to (12),
in which the share information is set for each of a plurality of the virtual objects.

(14)

The information processing device according to any one of (1) to (13),
in which the control unit performs the delay amount setting processing on each of a plurality of the virtual objects to be displayed.

(15)

The information processing device according to (1) to (14),
in which the device displays the virtual object and is configured as a portable wearable display.

(16)

The information processing device according to any one of (1) to (15),
in which the delay amount setting processing is performed in each of a plurality of the information processing devices operated by the same application.

(17)

An information processing method performed by a control unit, including
displaying a virtual object on a three-dimensional coordinate space associated with a real space and causing the virtual object to perform a predetermined movement according to a predetermined sound reproduced from a real sound source disposed in the real space,
in which the control unit performs delay amount setting processing of increasing a delay amount of movement start timing at which the virtual object is caused to perform the predetermined movement with respect to reproduction timing at which the real sound source reproduces the predetermined sound, as a position of the real sound source in the real space and a position of the virtual object on the three-dimensional coordinate space are separated from each other.

(18)

A program that causes a computer to execute an information processing method performed by a control unit, in which the method includes
displaying a virtual object on three-dimensional coordinate space associated with a real space, and causing the virtual object to perform a predetermined movement according to a predetermined sound reproduced from a real sound source disposed in the real space,
in which the control unit performs delay amount setting processing of increasing a delay amount of movement start timing at which the virtual object is caused to perform the predetermined movement with respect to reproduction timing at which the real sound source reproduces the predetermined sound, as a position of the real sound source in the real space and a position of the virtual object on the three-dimensional coordinate space are separated from each other.

REFERENCE SIGNS LIST

1 Reproduction system
2 Stage
3, 50 Speaker
30 Server
40 Smart display
401 Control unit
401C Virtual object absolute position calculation unit
401D Distance calculation unit
401E Start time calculation unit
405 Self-position information acquisition unit
C virtual object
UA, UB User

The invention claimed is:

1. An information processing device comprising
a control unit configured to
    initiate display of a virtual object on a three-dimensional coordinate space, the three-dimensional coordinate space being associated with a real space,
    cause the virtual object to perform a predetermined movement according to a predetermined sound reproduced from a real sound source disposed in the real space, and
    perform delay amount setting processing that includes increasing a delay amount between a movement start timing at which the virtual object is caused to perform the predetermined movement and a reproduction timing at which the real sound source reproduces the predetermined sound, as a distance between a position of the real sound source on the three-dimensional coordinate space associated with the real space and a position of the virtual object on the three-dimensional coordinate space associated with the real space increases,
wherein the control unit is implemented via at least one processor.

2. The information processing device according to claim 1,
    wherein the control unit is further configured to acquire the position of the virtual object on the associated three-dimensional coordinate space using a relative position of the virtual object defined with respect to a position of the information processing device on the three-dimensional coordinate space associated with the real space.

3. The information processing device according to claim 2,
    wherein the control unit is further configured to
    calculate the distance between the position of the real sound source and the position of the virtual object on the associated three-dimensional coordinate space, and
    set the delay amount on a basis of a result of the calculation.

4. The information processing device according to claim 3,
    wherein the position of the real sound source in the real space is supplied from an external device.

5. The information processing device according to claim 2,
    wherein the position of the information processing device is variable.

6. The information processing device according to claim 2 further comprising:
    a position information acquisition unit configured to acquire the position of the information processing device,
    wherein the position information acquisition unit is implemented via at least one processor.

7. The information processing device according to claim 1,
    wherein the control unit is further configured to perform synchronization processing of setting the movement start timing to predetermined timing regardless of the delay amount.

8. The information processing device according to claim 7,
    wherein the control unit is further configured to
        determine the movement start timing on a basis of the synchronization processing in a case where synchronization is set as predetermined synchronization information, and
        determine the movement start timing on a basis of the delay amount setting processing in a case where asynchronization is set as predetermined synchronization information.

9. The information processing device according to claim 8,
    wherein the synchronization information is set for each of a plurality of virtual objects.

10. The information processing device according to claim 7,
    wherein the predetermined timing is common timing to another information processing device operated by a same application.

11. The information processing device according to claim 7,
    wherein in a case where the synchronization processing is performed, the control unit displays information corresponding to the synchronization processing.

12. The information processing device according to claim 1,
    wherein in a case where share is set as predetermined share information, the control unit displays the virtual object so as to correspond to a positional relation between a position of the information processing device on the three-dimensional coordinate space associated with the real space and the position of the virtual object on the associated three-dimensional coordinate space, and
    wherein in a case where not-share is set as predetermined share information, the control unit displays the virtual object so as to correspond to a positional relation between a position of each of a plurality of information processing devices on the three-dimensional coordinate space associated with the real space and the position of the virtual object on the associated three-dimensional coordinate space.

13. The information processing device according to claim 12,
    wherein the share information is set for each of a plurality of virtual objects.

14. The information processing device according to claim 1,
    wherein the control unit performs the delay amount setting processing for each of a plurality of virtual objects to be displayed.

15. The information processing device according to claim 1,
    wherein the information processing device includes a portable wearable display that displays the virtual object.

16. The information processing device according to claim 1,
    wherein the delay amount setting processing is performed in each of a plurality of information processing devices operated by a same application.

17. An information processing method performed by a control unit implemented via at least one processor, the method comprising:
    displaying a virtual object on a three-dimensional coordinate space, the three-dimensional coordinate space being associated with a real space;

causing the virtual object to perform a predetermined movement according to a predetermined sound reproduced from a real sound source disposed in the real space; and performing delay amount setting processing that includes increasing a delay amount between a movement start timing at which the virtual object is caused to perform the predetermined movement and a reproduction timing at which the real sound source reproduces the predetermined sound, as a position of the real sound source on the three-dimensional coordinate space associated with the real space and a position of the virtual object on the three-dimensional coordinate space associated with the real space increases.

18. A non-transitory computer-readable storage medium having embodied thereon a program, which when executed by a computer causes the computer to execute an information processing method, the method comprising:

displaying a virtual object on a three-dimensional coordinate space, the three-dimensional coordinate space being associated with a real space;

causing the virtual object to perform a predetermined movement according to a predetermined sound reproduced from a real sound source disposed in the real space; and performing delay amount setting processing that includes increasing a delay amount between a movement start timing at which the virtual object is caused to perform the predetermined movement a reproduction timing at which the real sound source reproduces the predetermined sound, as a position of the real sound source on the three-dimensional coordinate space associated with the real space and a position of the virtual object on the three-dimensional coordinate space associated with the real space increases.

* * * * *